United States Patent
Wang

(10) Patent No.: US 12,373,368 B2
(45) Date of Patent: Jul. 29, 2025

(54) CONTROLLER CAPABLE OF PREPARING CAPABILITY INFORMATION FOR AN INTERCONNECTION PROTOCOL AND ELECTRONIC DEVICE

(71) Applicant: SK hynix Inc., Icheon-si (KR)

(72) Inventor: Lan Feng Wang, Zhubei (TW)

(73) Assignee: SK hynix Inc., Icheon-si (KR)

( * ) Notice: Subject to any disclaimer, the term of this patent is extended or adjusted under 35 U.S.C. 154(b) by 85 days.

(21) Appl. No.: 18/116,595

(22) Filed: Mar. 2, 2023

(65) Prior Publication Data

US 2024/0241848 A1 Jul. 18, 2024

(30) Foreign Application Priority Data

Jan. 12, 2023 (TW) .................................. 112101323

(51) Int. Cl.
*G06F 13/36* (2006.01)
(52) U.S. Cl.
CPC .......... *G06F 13/36* (2013.01); *G06F 2213/40* (2013.01)
(58) Field of Classification Search
CPC .................................................... G06F 16/955
See application file for complete search history.

(56) References Cited

U.S. PATENT DOCUMENTS

| | | | |
|---|---|---|---|
| 5,163,054 A * | 11/1992 | Nagy | H04L 1/1642 714/748 |
| 8,621,128 B2 | 12/2013 | Radulescu et al. | |
| 9,904,651 B2 | 2/2018 | Park | |
| 10,510,382 B2 | 12/2019 | Shin et al. | |
| 10,572,427 B2 | 2/2020 | Rosensprung et al. | |
| 10,635,313 B2 | 4/2020 | Park et al. | |
| 10,929,236 B2 | 2/2021 | Cho | |
| 2005/0027877 A1* | 2/2005 | Fike | H04L 49/357 709/236 |
| 2021/0334225 A1 | 10/2021 | Seo et al. | |
| 2021/0397368 A1* | 12/2021 | Nam | G06F 3/0634 |

* cited by examiner

*Primary Examiner* — Henry Tsai
*Assistant Examiner* — Juanito C Borromeo
(74) *Attorney, Agent, or Firm* — WILLIAM PARK & ASSOCIATES LTD.

(57) ABSTRACT

A controller capable of preparing capability information for an interconnection protocol and an electronic device are provided. The controller is for a first device linkable to a second device according to the interconnection protocol. The controller includes a hardware protocol engine and a processing unit. The hardware protocol engine is for implementing a link layer of the interconnection protocol, and capable of performing capability extraction and frame formatting to output capability frame information to a data buffer region and capable of sending, according to content of the data buffer region, a capability frame to the second device during Link Startup Sequence (LSS) capability exchange for the interconnection protocol. The processing unit is configured to be capable of modifying, during the LSS capability exchange, the content of the data buffer region after the capability frame information is output to the data buffer region and before the capability frame is sent to the second device.

12 Claims, 13 Drawing Sheets

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 1 | ESC_PA ||||||||| EscParam_PA = PACP_BEGIN |||||||
| 0 | PACP_FunctionID = PACP_CAP_ind ||||||||||||||||
| 0 | TSleepNoConfig |||||| Reserved || Flag || MaxHS || MaxPWM ||||
| 0 | TStallNoConfig |||||||| TSaveConfig ||||||||
| 0 | Version information ||||||||||||||||
| 0 | Reserved ||||||||||||||||
| 0 | Reserved ||||||||||||||||
| 0 | Reserved ||||||||||||||||
| 0 | CRC-16 ||||||||||||||||

FIG. 4A

| | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| | 1 | ESC_PA | | | | | | | | EscParam_PA=PACP_CBEGIN | | | | | | | |
| | 0 | PACP_FunctionID = PACP_CAP_EXT1_ind | | | | | | | | | | | | | | | |
| | 0 | Thibern8 | | | | | | | | TMinActivate | | | | Status | | | |
| | 0 | TAdvHibern8 | | | | | | | | TAdvMinActivate | | | | RxAdvGranularity | | | |
| | 0 | MinRxTrailingClocks | | | | | | | | RxPwmBurstClosureLength | | | | | | | |
| | 0 | RxLsPrepareLength | | | | | | | | RxPwmG6G7SyncLength | | | | | | | |
| | 0 | RxHsG3PrepareLength | | | | | | | | RxHsG3syncLength | | | | | | | |
| | 0 | RxHsG3PrepareLength | | | | | | | | RxHsG3syncLength | | | | | | | |
| | 0 | RxHsG3PrepareLength | | | | | | | | RxHsG3syncLength | | | | | | | |
| | 0 | Reserved | | | | | | | | | | | | | | | |
| | 0 | Reserved | | | | | | | | | | | | | | | |
| | 0 | CRC-16 | | | | | | | | | | | | | | | |

FIG. 4B

| 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 1 | ESC_PA | | | | | | | | EscParam_PA=PACP_CBEGIN | | | | | | | |
| 0 | PACP_FunctionID = PACP_CAP_EXT2_ind | | | | | | | | | | | | | | | |
| 0 | Reserved | | | | | | | | | | | MaxHS | | | | |
| 0 | RxHsG4PrepareLength | | | | | | | | RxHsG4sSyncLength | | | | | | | |
| 0 | RxHsAdaptRefresh | | | | | | | | RxHsAdaptInitial | | | | | | | |
| 0 | Reserved | | | | | | | | | | | | | | | |
| 0 | Reserved | | | | | | | | | | | | | | | |
| 0 | Reserved | | | | | | | | | | | | | | | |
| 0 | Reserved | | | | | | | | | | | | | | | |
| 0 | Reserved | | | | | | | | | | | | | | | |
| 0 | Reserved | | | | | | | | | | | | | | | |
| 0 | Reserved | | | | | | | | | | | | | | | |
| 0 | Reserved | | | | | | | | | | | | | | | |
| 0 | CRC-16 | | | | | | | | | | | | | | | |

FIG. 4C

| 16 | 15 | 14 | 13 | 12 | 11 | 10 | 9 | 8 | 7 | 6 | 5 | 4 | 3 | 2 | 1 | 0 |
|----|----|----|----|----|----|----|----|----|----|----|----|----|----|----|----|----|
| 1 | ESC_PA | | | | | | | | EscParam_PA=PACP_CBEGIN | | | | | | | |
| 0 | PACP_FunctionID=PACP_CAP_ind | | | | | | | | | | | | | | | |
| 0 | TSleepNoConfig | | | | | | | Reserved | | | Flag | | MaxHS | | MaxPWM | |
| 0 | TStallNoConfig | | | | | | | | | | | | TSaveConfig | | | |
| 0 | Version information | | | | | | | | | | | | | | | |
| 0 | PACapabilityUserData | | | | | | | | | | | | | | | |
| 0 | Reserved | | | | | | | | | | | | | | | |
| 0 | Reserved | | | | | | | | | | | | | | | |
| 0 | CRC-16 | | | | | | | | | | | | | | | |

FIG. 7A

| 16 | 15 14 13 12 11 10 9 8 | 7 6 5 4 3 2 1 0 |
|---|---|---|
| 1 | ESC_PA | EscParam_PA=PACP_CBEGIN |
| 0 | PACP_FunctionID = PACP_CAP_EXT2_ind | |
| 0 | TextSaveConfig | Reserved / MaxHS |
| 0 | RxHsG4PrepareLength | RxHsG4SyncLength |
| 0 | RxHsG4AdaptRefresh | RxHsG4AdaptInitial |
| 0 | RxHsG5PrepareLength | RxHsG5SyncLength |
| 0 | RxHsG5AdaptRefresh | RxHsG5AdaptInitial |
| 0 | Reserved | |
| 0 | Reserved | |
| 0 | Reserved | |
| 0 | Reserved | |
| 0 | Reserved | |
| 0 | Reserved | |
| 0 | CRC-16 | |

FIG. 7B

CONTROLLER CAPABLE OF PREPARING CAPABILITY INFORMATION FOR AN INTERCONNECTION PROTOCOL AND ELECTRONIC DEVICE

CROSS-REFERENCE TO RELATED APPLICATION

This non-provisional application claims priority under 35 U.S.C. § 119(a) on Patent Application No. 112101323 filed in Taiwan, R.O.C. on Jan. 12, 2023, the entire contents of which are hereby incorporated by reference.

BACKGROUND OF THE INVENTION

1. Field of the Invention

The present disclosure relates to an electronic device, and in particular to a controller capable of preparing capability information for an interconnection protocol and an electronic device.

2. Description of the Related Art

In current mobile devices (e.g., computing devices such as smartphones, tablet computers, multimedia devices and wearable devices), the amounts of data sent and processed are continually increasing, and interconnection interface technologies from one chip to another inside the mobile devices or those affected by the mobile devices need to evolve further, so as to achieve goals of higher transmission speeds, low power consumption operations, expandability, support for multi-tasking, and ease of adoption.

To these ends, the Mobile Industry Processor Interface (MIPI) alliance has developed an interconnection interface technology that meets the goals above, for example, the MIPI M-PHY specification associated with a physical layer and the MIPI UniPro specification associated with the Unified Protocol (UniPro). On the other hand, the Joint Electron Device Engineering Council (JEDEC), using the MIPI M-PHY specification and the universal transfer protocol MIPI UniPro specification, has launched a next-generation high-performance non-volatile memory standard that is referred to as Universal Flash Storage (UFS). The UFS realizes gigabit-level high-speed transmissions and low power consumption, and provides the functionality and expandability required for advanced mobile systems to facilitate rapid adoption by the industry.

A system according to the UFS standard includes a computing device and a storage device having a non-volatile memory, wherein the computing device and the storage device respectively serve as a local host and a remote device. In order to communicate based on the UFS standard, the local host and the remote device need to perform a process of establishing a link according to the UniPro specification adopted by the UFS standard, and transmit to each other capability information with respect to the link during the process of establishing the link, so as to cooperate with each other to complete link establishment. Such capability information needs to be prepared respectively at the local host and the remote device. The UniPro specification specifies the respective capability information that needs to be prepared.

BRIEF SUMMARY OF THE INVENTION

The present disclosure provides a plurality of embodiments of a controller capable of preparing capability information for an interconnection protocol and an electronic device using the controller. Thus, the electronic device is capable of more efficiently and flexibly preparing the capability information according to the specification of the interconnection protocol, thereby facilitating link establishment.

According to an embodiment provided by the present disclosure, a controller is suitable for a first device and is configured to be capable of preparing capability information for an interconnection protocol in the first device that is linkable to a second device according to the interconnection protocol. The controller includes a hardware protocol engine and a processing unit. The hardware protocol engine is for implementing a link layer of the interconnection protocol, wherein the hardware protocol engine is configured to be capable of performing capability extraction and frame formatting to output capability frame information to a data buffer region and capable of sending, according to content of the data buffer region, at least one capability frame to the second device during Link Startup Sequence (LSS) capability exchange for the interconnection protocol, and the at least one capability frame includes a first capability frame. The processing unit is coupled to the hardware protocol engine, and is configured to be capable of modifying, during the LSS capability exchange for the interconnection protocol, the content of the data buffer region after the hardware protocol engine outputs the capability frame information to the data buffer region and before the at least one capability frame is sent to the second device.

According to an embodiment provided by the present disclosure, an electronic device is linkable to another electronic device according to an interconnection protocol. The electronic device includes an interface circuit, a hardware protocol engine, and a processing unit. The interface circuit is for implementing a physical layer of the interconnection protocol to link to the another electronic device. The hardware protocol engine is coupled to the interface circuit and is for implementing a link layer of the interconnection protocol, wherein the hardware protocol engine is further configured to be capable of performing capability extraction and frame formatting to output capability frame information to a data buffer region and capable of sending, according to content of the data buffer region, at least one capability frame to the another electronic device during Link Startup Sequence (LSS) capability exchange for the interconnection protocol, and the at least one capability frame includes a first capability frame. The processing unit is coupled to the hardware protocol engine, and is configured to be capable of modifying, during the LSS capability exchange for the interconnection protocol, the content of the data buffer region after the hardware protocol engine outputs the capability frame information to the data buffer region and before the at least one capability frame is sent to the another electronic device.

In some embodiments of the controller or the electronic device above, the hardware protocol engine is configured to be capable of performing capability extraction and frame formatting with respect to the first capability frame to output first capability frame information for the first capability frame to the data buffer region, and the processing unit is configured to be capable of performing capability extraction and frame formatting with respect to the first capability frame to output second capability frame information for the first capability frame to the data buffer region.

In some embodiments of the controller or the electronic device above, the hardware protocol engine is configured to be capable of performing capability extraction and frame formatting according to a first version of data structure of the first capability frame to output first capability frame information for the first capability frame to the data buffer region, and the processing unit is configured to be capable of performing capability extraction and frame formatting according to a second version of data structure of the first capability frame to output second capability frame information for the first capability frame to the data buffer region.

In some embodiments of the controller or the electronic device above, the first capability frame information corresponds to the first version of data structure of the first capability frame and the second capability frame information corresponds to different data fields of the second version of data structure of the first capability frame as compared with the first version of data structure of the first capability frame.

In some embodiments of the controller or the electronic device above, the hardware protocol engine includes a capability frame preparation circuit including a capability information collection circuit, a frame formatting circuit, a memory, and a flow control circuit. The capability information collection circuit is for performing reading operations on registers associated with a plurality of data fields in the capability frame to collect data for the data fields. The frame formatting circuit is for performing frame formatting according to the data for the data fields and a data structure of the capability frame and storing corresponding frame formatting results in the data buffer region. The memory includes the data buffer region. The flow control circuit is coupled to the capability information collection circuit, the frame formatting circuit, and the memory, and is for controlling the capability information collection circuit and the frame formatting circuit. The flow control circuit activates the capability information collection circuit to collect the data for the data fields. The flow control circuit further activates the frame formatting circuit to receive the collected data for the data fields, performs frame formatting, and stores the corresponding frame formatting results in the data buffer region.

In some embodiments of the controller or the electronic device above, the link layer is implemented according to the United Protocol (UniPro) specification and the at least one capability frame is a Physical Adapter Layer Control Protocol (PACP) frame.

In some embodiments of the controller or the electronic device above, the interconnection protocol is based on the Universal Flash Storage (UFS) standard.

BRIEF DESCRIPTION OF THE DRAWINGS

FIG. 4A is a schematic diagram of an example of a PACP frame according to the UniPro specification.

FIG. 4B is a schematic diagram of another example of a PACP frame according to the UniPro specification.

FIG. 4C is a schematic diagram of yet another example of a PACP frame according to the UniPro specification.

FIG. 7A is a schematic diagram of an example of a PACP frame according to the UniPro specification.

FIG. 7B is a schematic diagram of another example of a PACP frame according to the UniPro specification.

DETAILED DESCRIPTION OF THE INVENTION

To facilitate understanding of the object, characteristics and effects of the present disclosure, embodiments together with the attached drawings for the detailed description of the present disclosure are provided below.

A plurality of embodiments of a controller capable of preparing capability information for an interconnection protocol and an electronic device using the controller are provided below. Thus, the electronic device is capable of more efficiently and flexibly preparing the capability information according to the specification of the interconnection protocol to thereby facilitate link establishment. In some embodiments, in response to changes in the content of capability information required by an updated version of the interconnection protocol, the capability information can still be efficiently prepared for the interconnection protocol without changing the hardware design by way of configuring cooperation of circuits and firmware of the controller.

Figure 1A:
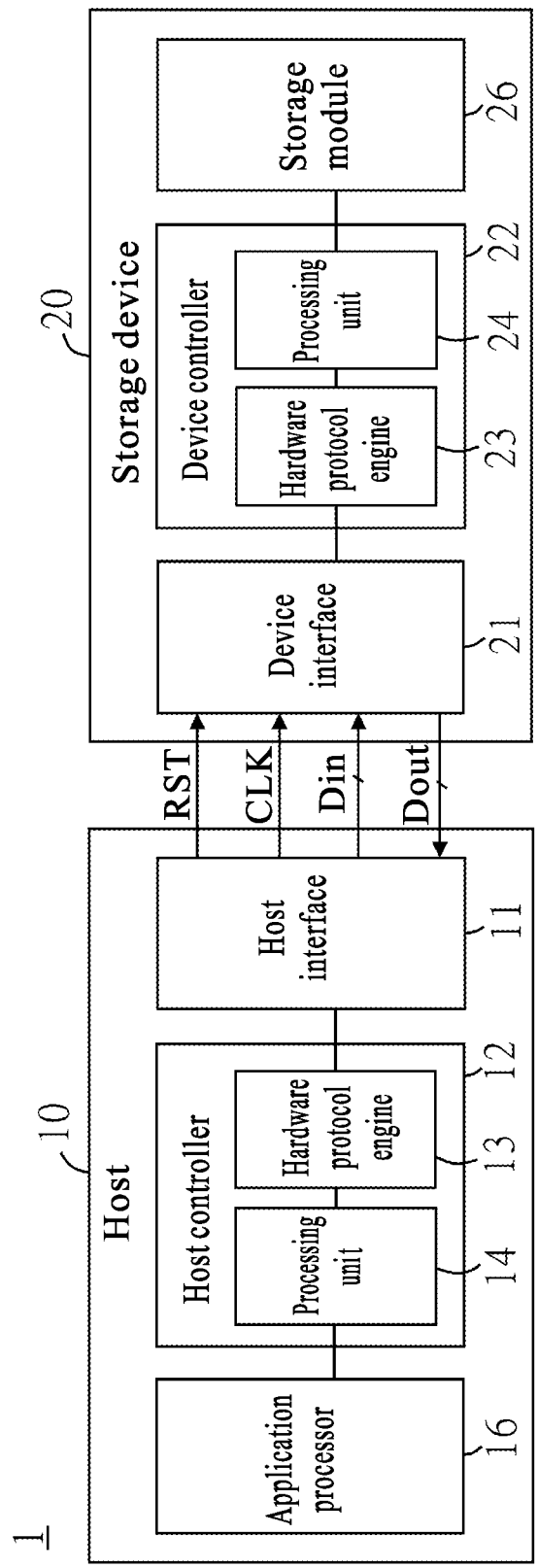
FIG. 1A is a schematic circuit architecture of a storage system according to an embodiment.
Figure 1B:
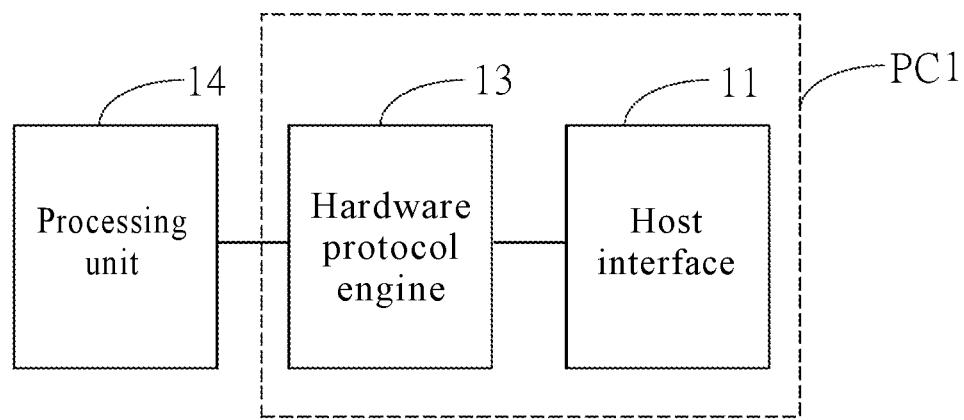
FIG. 1B is a block diagram applicable to a controller for an interconnection protocol in FIG. 1A according to an embodiment.
Figure 1C:
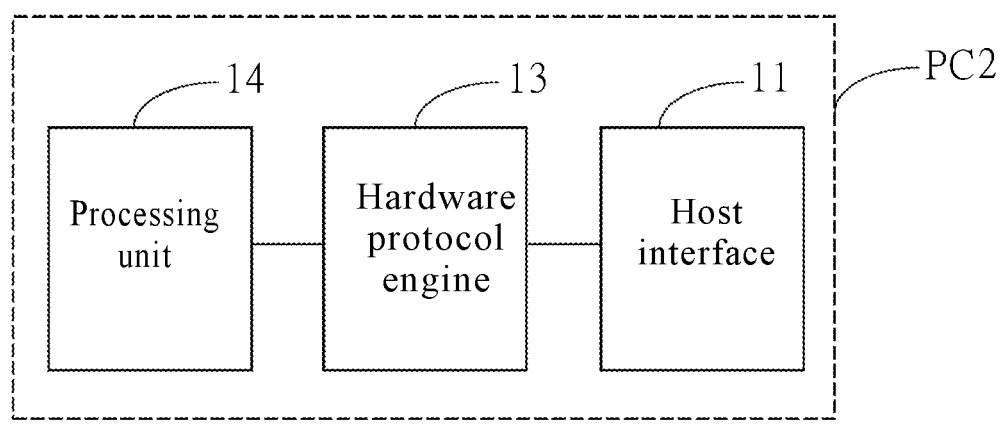
FIG. 1C is a block diagram applicable to the controller for an interconnection protocol in FIG. 1A according to another embodiment.

To better understand and illustrate the various implementations of techniques capable of preparing capability information for an interconnection protocol, a circuit architecture of an interconnection protocol-based communication system is first provided below. Refer to FIG. 1A showing a schematic circuit architecture according to an embodiment. As shown in FIG. 1A, a storage system 1 includes a host 10 and a storage device 20. The host 10 and the storage device 20 communicate with each other through an interconnection protocol, thereby allowing the host 10 to perform data access to the storage device 20. The interconnection protocol is, for example, the Universal Flash Storage (UFS) standard, or other suitable chip-to-chip communication protocols. According to the circuit architecture in FIG. 1A, the foregoing techniques are applicable to a first device (e.g., the storage device 20 in FIG. 1A) capable of linking to a second device (e.g., the host 10 in FIG. 1A) according to the interconnection protocol, and is also suitable in an application scenario where the first device is the host 10 and the second device is the storage device 20. In the circuit architecture of FIG. 1A, a controller in the host 10 or in the storage device 20 for implementing the interconnection protocol may be implemented by various approaches. As shown in FIG. 1A, the controller (e.g., a host controller 12) in the host 10 for implementing the interconnection protocol or the controller (e.g., a device controller 22) in the storage device 20 for implementing the interconnection protocol can be realized as a circuit architecture including a hardware protocol engine and a processing unit, wherein the processing unit of the controller is optional. In another example, as shown in FIG. 1B, the controller in the host 10 for implementing the interconnection protocol, which is referred to as, for example, a protocol controller PC1, can be configured to include a host interface 11 and a hardware protocol engine 13 and be implemented as a single chip, wherein a processing unit 14 may be regarded as an external circuit of the protocol controller PC1. Moreover, similarly, the controller (or referred to as a protocol controller of the storage device 20) in the storage device 20 for implementing the interconnection protocol can be configured to include a device interface 21 and a hardware protocol engine 23 and be implemented as a single chip, wherein a processing unit 24 may be regarded as an external circuit of the protocol controller. For another example, as shown in FIG. 1C, the controller in the host 10 for implementing the interconnection protocol, for example, a protocol controller PC2, can be configured to include the host interface 11, the hardware protocol engine 13 and the processing unit 14, and be implemented as a single chip. Moreover, similarly, the controller (or referred to as a protocol controller of the storage device 20) in the storage device 20 for implementing the interconnection protocol can be configured to include the device interface 21, the hardware protocol engine 23 and the processing unit 24, and be implemented as a single chip. Thus, according to the circuit architecture in FIG. 1A, the controller in the host 10 or the storage device 20 for implementing the interconnection protocol can be regarded as comprising or representing the embodiment based on FIG. 1A, FIG. 1B or FIG. 1C. The description of other examples related to FIG. 1A below is also suitable for the embodiments based on FIG. 1A, FIG. 1B or FIG. 1C.

The circuit architecture shown in FIG. 1A has sufficient flexibility and can be efficiently configured to meet requirements for different products, so as to adapt to diversified designs of manufacturers for better product development. The host 10 is, for example, a computing device such as a smartphone, a tablet computer or a multimedia device. The storage device 20 is, for example, a storage device inside or outside the computing device, and is such as a storage device based on a non-volatile memory. The storage device 20 can be written with data under control of the host 10 or provide written data to the host 10. The storage device 20 can be implemented as a solid state drive (SSD), a multimedia card (MMC), an embedded Multimedia card (eMMC), a Secure Digital (SD) card, or a UFS device; however, the implementation of the present disclosure is not limited to the examples above.

The host 10 includes the host interface 11, the host controller 12 and an application processor 16.

The host interface 11 is for implementing a physical layer of the interconnection protocol so as to link to the storage device 20. For example, the host interface 11 implements a physical (M-PHY) layer of the UFS standard.

The host controller 12 is coupled between the host interface 11 and the application processor 16. When the application processor 16 needs to perform data access to the storage device 20, it sends a corresponding access operation command or write data to the host controller 12 and communicates with the storage device 20 through the interconnection protocol, thereby completing data access to the storage device 20.

The host controller 12 includes, for example, the hardware protocol engine 13 and the processing unit 14, wherein the processing unit 14 is optional.

The hardware protocol engine 13 is for implementing a link layer of the interconnection protocol. Taking the UFS standard as the interconnection protocol for example, the link layer is a Unified Protocol (UniPro) layer. The hardware protocol engine 13 communicates with the host interface 11 and the processing unit 14 and performs data conversion according to the specification of the link layer.

The processing unit 14 is coupled to the hardware protocol engine 13, and communicates with the application processor 16. The processing unit 14 can execute one or more pieces of firmware. For example, an access operation command or write data sent by an operating system, a driver, or an application executed by the application processor 16 is converted into data compliant with a command format compliant with the link layer of the interconnection protocol by the firmware executed by the processing unit 14, and is then sent to the hardware protocol engine 13 for processing according to the specification of the link layer. Or conversely, read data returned by the storage device 20 in response to a read command of the host 10 is sent back to the hardware protocol engine 13 according to the specification of the link layer of the interconnection protocol, and is converted by the corresponding firmware executed by the processing unit 14 into data compliant with a format compliant with readable by the operating system, driver or application executed by the application processor 16. The firmware can be stored, for example, in an internal memory of the processing unit 14, or be stored in an internal memory of the host controller 12, wherein the internal memory can include a volatile memory and a non-volatile memory. The processing unit 14 is optional; that is, the task of the firmware above may be implemented by way of hardware at the hardware protocol engine 13.

The storage device 20 includes the device interface 21, the device controller 22 and a storage module 26.

The device interface 21 is for implementing a physical layer of the interconnection protocol so as to link to the host 10. For example, the device interface 21 is for implementing a physical (M-PHY) layer of the UFS standard.

The device controller 22 is coupled between the device interface 21 and the storage module 26. The device controller 22 fundamentally has functions corresponding to those of the host controller 12 described above. When the host 10 issues and sends an access operation command or write data to the storage device 20 through the interconnection protocol, the device controller 22 converts the data received through the interconnection protocol into a corresponding access operation command or write data for the storage module 26 so as to facilitate data access to be performed by the storage module 26. Or conversely, the device controller 22 sends, according to the specification of the link layer of the interconnection protocol, read data returned by the storage device 20 to the host 10 in response to the read command of the host 10. The storage module 26 includes, for example, a memory chip of one or more non-volatile memories, and is, for example, a flash memory chip. Herein, in one example, the storage device 20 may further be provided with a flash memory controller. The flash memory controller is coupled between the device controller 22 and the storage module 26, and can be configured to control writing, reading, or erasing operations of the storage module 26, and is capable of exchanging data with the storage module 26 through an address bus or a data bus. In another example, the flash memory controller may be further provided in the device controller 22.

The device controller 22 includes the hardware protocol engine 23 and the processing unit 24, wherein the processing unit 24 is optional.

The hardware protocol engine 23 is for implementing a link layer of the interconnection protocol. Taking the UFS standard as the interconnection protocol for example, the link layer is a UniPro layer. The hardware protocol engine 23 communicates with the device interface 21 and the processing unit 24 and performs data conversion according to the specification of the link layer.

The processing unit 24 is coupled to the hardware protocol engine 23, and communicates with the host 10 through the device interface 21. The processing unit 24 can execute one or more pieces of firmware. For example, the processing unit 24 executes one or more pieces of firmware to communicate with the above flash memory controller, so as to exchange information such as an access operation command, write data, or read data between the interconnection protocol and the flash memory controller. The firmware can be stored, for example, in an internal memory of the processing unit 24, an internal memory of the device controller 22, or a specific storage region of the storage module 26, wherein the internal memory may be a volatile memory or a non-volatile memory.

As shown in FIG. 1A, the host interface 11 can be coupled to the device interface 21 through data lines Din and Dout for transmitting or receiving data, a reset line RST for transmitting a hardware reset signal and a clock line CLK for transmitting data. The data lines Din and Dout can be implemented in a plurality of pairs, wherein one pair of data lines Din or one pair of data lines Dout can be referred to as a lane. The host interface 11 can communicate with the device interface 21 by using at least one interface protocol, which is, for example, the MIPI, UFS, Small Computer System Interface (SCSI) or Serial Attached SCSI (SAS); however, the implementation of the present disclosure is not limited to the examples above. Under the UFS standard, the host 10 and the storage device 20 can be configured with multiple lanes in between to improve transmission efficiency, wherein either of the directions from the host 10 to the storage device 20 or from the storage device 20 to the host 10 can support two lanes at most, and the multiple lanes can be set to be active or inactive selectively.

Details are provided by taking the UFS standard as the interconnection protocol for example. The UFS standard includes a UFS command set (UCS) layer, a UFS transport (UTP) layer, and a UFS interconnect (UIC) layer. The UIC layer includes a link layer and a physical layer. The link layer of the UIC layer is defined according to the UniPro specification, and the physical layer of the UIC layer is defined according to the M-PHY specification.

Figure 2:
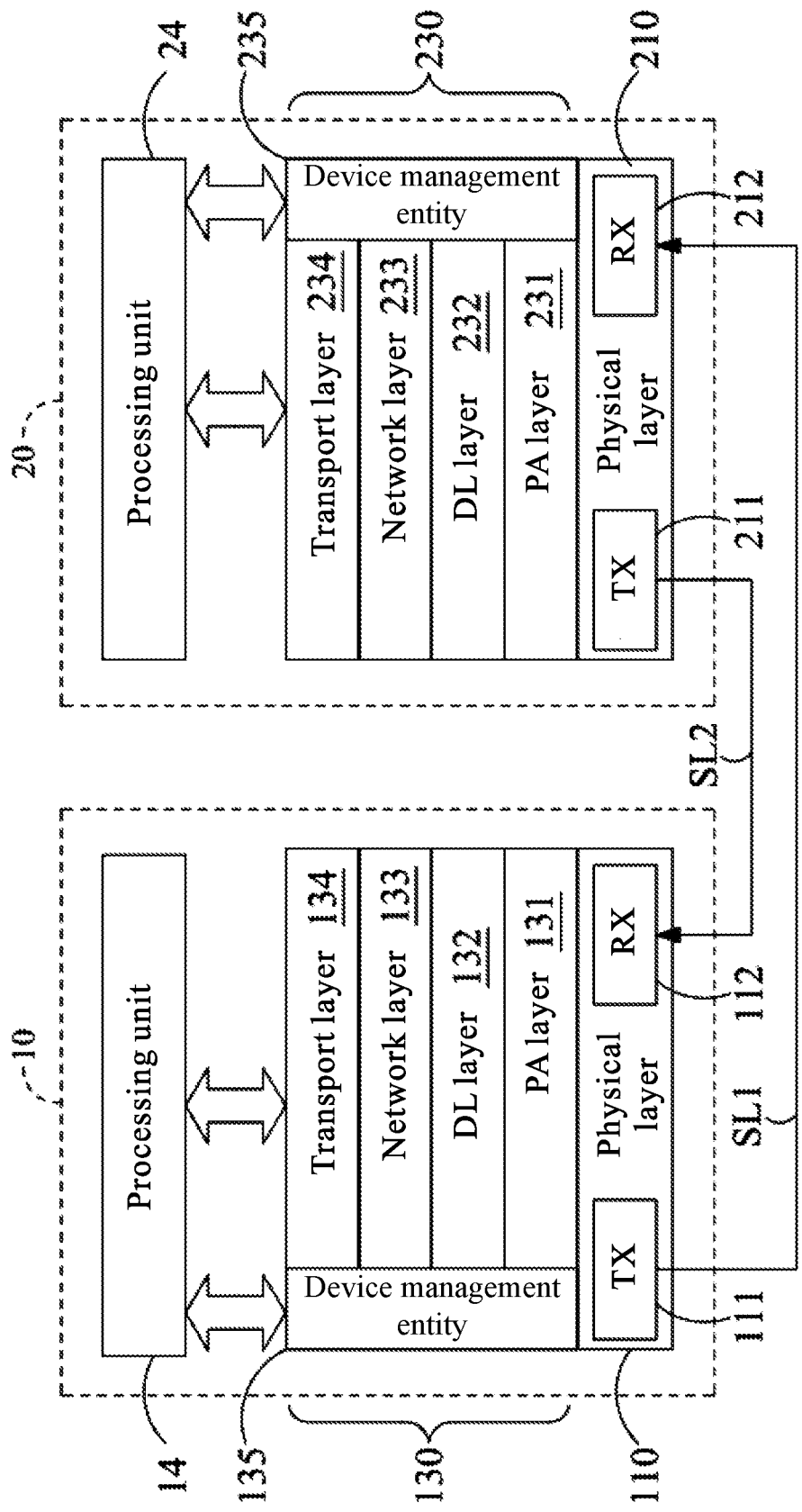
FIG. 2 is a schematic diagram of a layered architecture of the storage system in FIG. 1A according to the UFS standard.

Refer to FIG. 2 showing a schematic diagram of a layered architecture of the storage system in FIG. 1A according to the UFS standard. Because the UFS standard is based on the MIPI UniPro layer and the MIPI M-PHY layer, the host interface 11 and the hardware protocol engine 13 of the host 10 shown in FIG. 1A are respectively used for implementing a physical layer 110 and a UniPro layer 130 in FIG. 2, and the device interface 21 and the hardware protocol engine 23 of the storage device 20 in FIG. 1A are respectively used for implementing a physical layer 210 and a UniPro layer 230 in FIG. 2.

As shown in FIG. 2, the UniPro layer 130 (or 230) can include a PHY adapter (PA) layer 131 (or 231), a data link (DL) layer 132 (or 232), a network layer 133 (or 233), and a transport layer 134 (or 234). The layers in the UniPro layer 230 of the storage device 20 can also similarly operate and be implemented.

The PHY adapter layer (131 or 231) couples the physical layer (110 or 210) to the data link layer (132 or 232). The PHY adapter layer (131 or 231) is capable of performing bandwidth control and power management between the physical layer (110 or 210) and the data link layer (132 or 232). In practice, the physical layer 110 of the host 10 includes a transmitter (TX) 111 and a receiver (RX) 112, and the physical layer 210 of the storage device 20 includes a transmitter (TX) 211 and a receiver (RX) 212, thereby establishing data lanes SL1 and SL2 to perform full duplex communication. The UniPro specification supports a plurality of data lanes for a link in each transmission direction (e.g., forward or backward).

The data link layer (132 or 232) is capable of performing flow control of data transmission between the host 10 and the storage device 20. That is, the data link layer (132 or 232) can monitor data transmission or control a data transmission rate. Moreover, the data link layer (132 or 232) can perform cyclic redundancy check (CRC)-based error control. The data link layer (132 or 232) can use packets received from the network layer (133 or 233) to generate frames, or can use frames received from the PHY adapter layer (131 or 231) to generate packets.

The network layer (133 or 233) is used for a routing function for selecting a transmission path for the packets received from the transport layer (134 or 234).

The transport layer (134 or 234) can use a command received from the UFS application layer to configure a data segment suitable for the protocol and transmit the data segment to the network layer (133 or 233), or can extract a command from packets received from the network layer (133 or 233) and transmit the command to the UFS application layer. The transport layer (134 or 234) can use a sequence-based error control scheme to ensure validity of data transmission.

Moreover, a device management entity (DME) (135 or 235) is further defined in the UniPro layer (130 or 230), which can communicate with the layers in the physical layer (110 or 210) and the UniPro layer (130 or 230), for example, the PHY adapter layer (131 or 231), the data link layer (132 or 232), the network layer (133 or 233) and the transport layer (134 or 234), so as to communicate with the UFS application layer, thereby implementing unified protocol (UniPro) overall functions such as control or configuration functions including power-on, power-off, reset and power mode change.

Various implementations of a controller capable of preparing capability information for an interconnection protocol are provided below. The description is provided with the assistance of the communication system of an interconnection protocol in FIG. 1A to FIG. 1C and the layered architecture based on the UFS standard in FIG. 2.

Figure 3A:
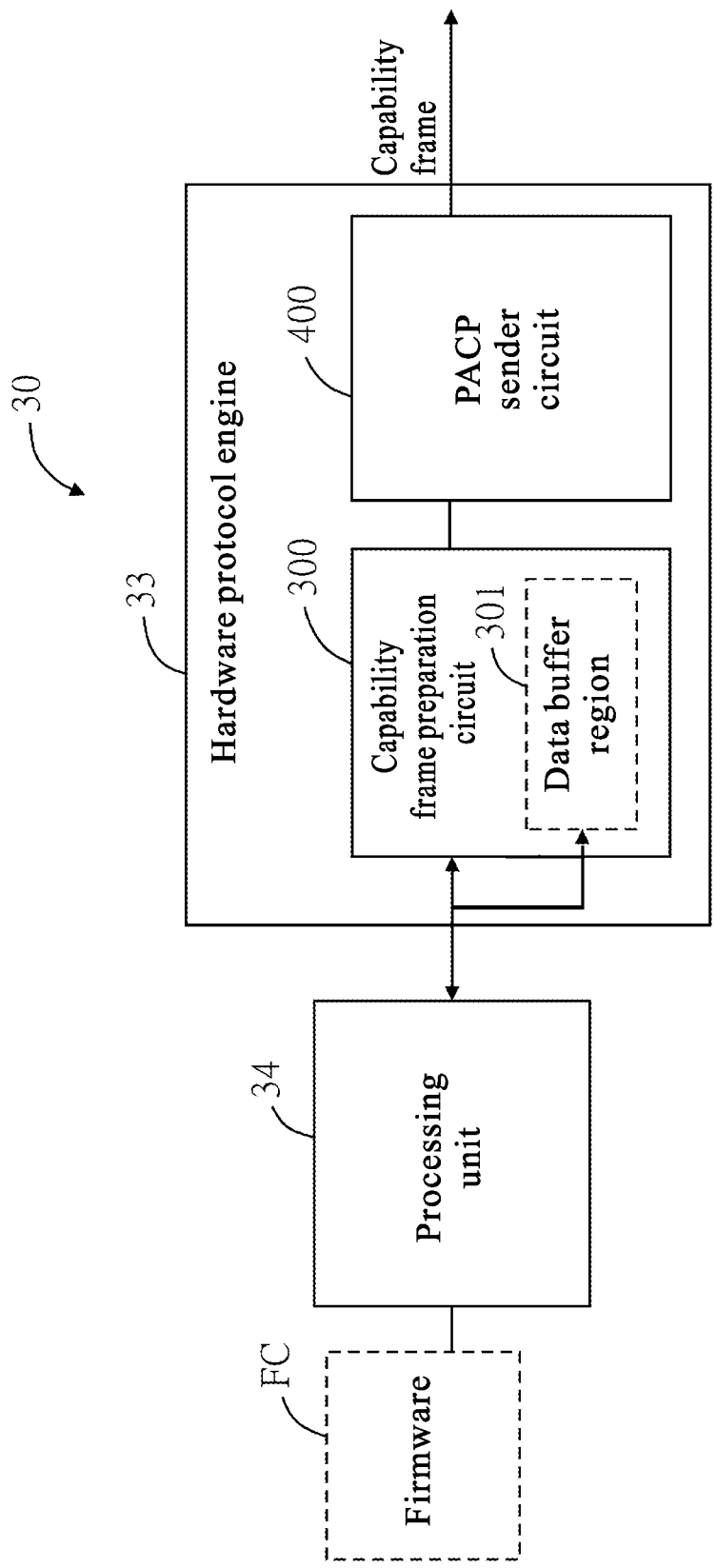
FIG. 3A is a block diagram of a circuit architecture of a controller capable of preparing capability information for an interconnection protocol according to an embodiment.

FIG. 3A shows a block diagram of a circuit architecture of a controller capable of preparing capability information for an interconnection protocol according to an embodiment. As shown in FIG. 3A, a circuit 30 is for implementing an interconnection protocol, and is capable of preparing capability information for the interconnection protocol. In FIG. 3A, the circuit 30 represents a circuit architecture and may cover various circuit implementations. The circuit 30 is, for example, implemented in an electronic device compliant with an interconnection protocol, such as in the host 10 or the storage device 20 in FIG. 1A, or implemented in a controller for implementing the interconnection protocol, such as a controller (12 or 22 in FIG. 1A; or PC1 in FIG. 1B and PC2 in FIG. 1C and related embodiments) for implementing the interconnection protocol in the host 10 or the storage device 20 in FIG. 1A.

As shown in FIG. 3A, the circuit 30 includes a hardware protocol engine 33 and a processing unit 34. If the circuit 30 or an associated embodiment is implemented in the host 10, the hardware protocol engine 33 and the processing unit 34 respectively represent the hardware protocol engine 13 and the processing unit 14 (as those shown in FIG. 1A, FIG. 1B or FIG. 1C); if the circuit 30 or an associated embodiment is implemented in the storage device 20, the hardware protocol engine 33 and the processing unit 34 respectively represent the hardware protocol engine 23 and the processing unit 24 (as those shown in FIG. 1A; or embodiments similar to those shown in FIG. 1B or 1C). For the sake of illustration, the circuit 30 can be described as for use in a first device linkable to a second device according to the interconnection protocol.

The hardware protocol engine 33 is used for implementing a link layer of the interconnection protocol, wherein the hardware protocol engine 33 is further used for performing capability extraction and frame formatting to output capability frame information to a data buffer region 301 and sending, according to content of the data buffer region 301, capability frames to the second device during Link Startup Sequence (LSS) capability exchange for the interconnection protocol. In FIG. 3A, the data buffer region 301 represents an area in a memory device (such as a data buffer) configured in the hardware protocol engine 33 to temporarily store data for constructing capability frames. The content of the data buffer region 301 refers to data temporarily stored in the data buffer region 301. As will be exemplified below, the hardware protocol engine 33 can be configured to output capability frame information to the data buffer region 301, and the processing unit 34 can also be configured to output capability frame information to the data buffer region 301 or modify the content of the data buffer region 301, so that the content of the data buffer region 301 can change according to the operations of the hardware protocol engine 33 and the processing unit 34. Moreover, according to the implementation of the circuit 30, the data buffer region 301 may be implemented as having a format capable of readily temporarily storing capability information, for example, having a data structure that partially or entirely corresponds to a certain capability frame. For example, the data buffer region 301 has one or more areas, wherein each area is memory addresses of a section of the data buffer region 301 and is designated to be associated with some or all fields in the data structure of a certain capability frame, and used to temporarily store values of these fields.

In an embodiment, the hardware protocol engine 33 includes a capability frame preparation circuit 300. The capability frame preparation circuit 300 is used for implementing capability extraction and frame formatting to output capability frame information to the data buffer region 301. The capability frame preparation circuit 300 is implemented in, for example, a physical adapter layer (e.g., 131 or 231 in FIG. 2) of a link layer (e.g., a UniPro layer).

The processing unit 34 is coupled to the hardware protocol engine 33, and is configured to be capable of modifying, during the Link Startup Sequence (LSS) capability exchange for the interconnection protocol, the content of the data buffer region 301 after the hardware protocol engine 33 outputs the capability frame information to the data buffer region 301 and before the capability frame is sent to the second device. For example, the processing unit 34 may be implemented by a processor, a microcontroller, or a similar programmable computing circuit. The processing unit 34 is capable of reading and executing associated program code for preparing capability information from a memory (e.g., a ROM, an EEPROM or any suitable memory) for storing firmware (e.g., denoted by FC in FIG. 3A), so that the processing unit 34 can be configured to be capable of modifying the content of the data buffer region 301; for example, the processing unit 34 is capable of accessing the content of the data buffer region 301. When the processing unit 34 is required to modify the content of the data buffer region 301, the processing unit 34 executes the program code to prepare in cooperation with the hardware protocol engine 33 the capability information for the interconnection protocol, so that the content of the data buffer region 301 can become capability frame information compliant with the interconnection protocol.

In the circuit 30 in FIG. 3A, the hardware protocol engine 33 is a circuit and belongs to implementation of hardware, and the processing unit 34 is configured with various operations or functions according to firmware (FC) and belongs to implementation of firmware. For example, a controller for implementing the interconnection protocol according to the circuit 30 can utilize the hardware protocol engine 33, or the processing unit 34, or both of the hardware protocol engine 33 and the processing unit 34, selectively, to thereby prepare the capability information. In other words, the implementation of hardware or firmware for preparing capability information may be enabled selectively according to requirements.

In an embodiment, the processing unit 34 can be configured by firmware to enable or disable the capability extraction or frame formatting in the hardware protocol engine 33.

In an embodiment, during the Link Startup Sequence (LSS) capability exchange for the interconnection protocol, the processing unit 34 can be configured by firmware to enable the capability extraction or frame formatting performed by the hardware at any time point before the capability frame is sent to the second device.

In an embodiment, after the capability extraction or frame formatting performed by the hardware is completed, the hardware protocol engine 33 can assert an indication signal (i.e., setting it to an asserted state) (or triggering an interrupt signal) so as to notify the processing unit 34. In some embodiments, the processing unit 34 can be configured, in addition, to further determine whether content of the data buffer region 301 is required to be modified after the processing unit 34 receives the indication signal, wherein the content of the data buffer region 301 can be used to generate the corresponding capability frame. If the processing unit 34 determines that the content of the data buffer region 301 is required to be modified, for example, additional information is required to be extracted from the link layer or the physical layer, the processing unit 34 then extracts the required additional information and accordingly modifies the content of the data buffer region 301, for example, modifying the content of the data buffer region 301 according to the extracted additional information. The processing unit 34 can be configured to modify the content of the data buffer region 301 according to actual requirements. For example, in response to specification requirements of the interconnection protocol on capability information, the processing unit 34 is configured by firmware to modify the content of the data buffer region 301, for example, appending new information to the content of the data buffer region 301. For another example, referring to capability downgrading mentioned in the UniPro specification or capability downgrading in other application scenarios, capability downgrading can be performed on a certain piece or portion of capability information in the content of the data buffer region 301. After modifying the content of the data buffer region 301, the processing unit 34, for example, sends a corresponding indication signal to notify the hardware protocol engine 33. Moreover, if the processing unit 34 determines that it is not required to modify the content of the data buffer region 301, the processing unit 34 may also send a corresponding indication signal to notify the hardware protocol engine 33.

The hardware protocol engine 33 generates one or more capability frames according to the content of the data buffer region 301. For example, the capability frame is a physical adapter layer control protocol (PACP) frame, and the hardware protocol engine 33 further includes a PACP sender circuit 400. The PACP sender circuit 400 is implemented in, for example, a circuit corresponding to a physical adapter layer (e.g., 131 or 231 in FIG. 2) of a link layer (e.g., a UniPro layer). The PACP sender circuit 400 is coupled to the capability frame preparation circuit 300, and is configured to be capable of reading the data buffer region 301 to generate one or more capability frames. For example, for a certain PACP frame for transmitting capability information, the PACP sender circuit 400 reads the content of the corresponding capability information in the data buffer region 301 in the capability frame preparation circuit 300, generates the PACP frame for transmitting the capability information compliant with requirements of the interconnection protocol accordingly, and then transmits the PACP frame to the physical layer. Finally, during the Link Startup Sequence (LSS) capability exchange for the interconnection protocol, the hardware protocol engine 33 sends the capability frame to the second device (or referred to as a peer side).

In some embodiments, the circuit architecture according to the circuit 30 in FIG. 3A can have several feasible implementations to prepare capability frames by hardware, by firmware, or by the cooperation of hardware and firmware. (1) If only firmware is used to configure the processing unit 34 to perform capability extraction and frame formatting, the capability extraction and frame formatting of the hardware protocol engine 33 can be deactivated. (2) If only the hardware protocol engine 33 is used to perform capability extraction and frame formatting, the capability extraction and frame formatting of the processing unit 34 can be deactivated. (3) If it is required to use the hardware protocol engine 33 and the processing unit 34 to prepare capability information, the processing unit 34 is allowed to modify the content of the data buffer region 301 (e.g., extracting additional information or modifying the content, or any suitable modifying method, as described in the related examples above) after the hardware protocol engine 33 completes the capability extraction and frame formatting. As such, in order to prepare capability information, the benefit of flexibility in implementation can be obtained according to the circuit architecture of the circuit 30 in FIG. 3A.

Thus, implementing the circuit architecture according to the circuit 30 in FIG. 3A in an electronic device (e.g., the host 10 or the storage device 20) makes the electronic device capable of preparing the capability information more efficiently and flexibly according to the specification of the interconnection protocol, thereby facilitating link establishment between two electronic devices that communicate with each other according to the interconnection protocol.

Figure 3B:
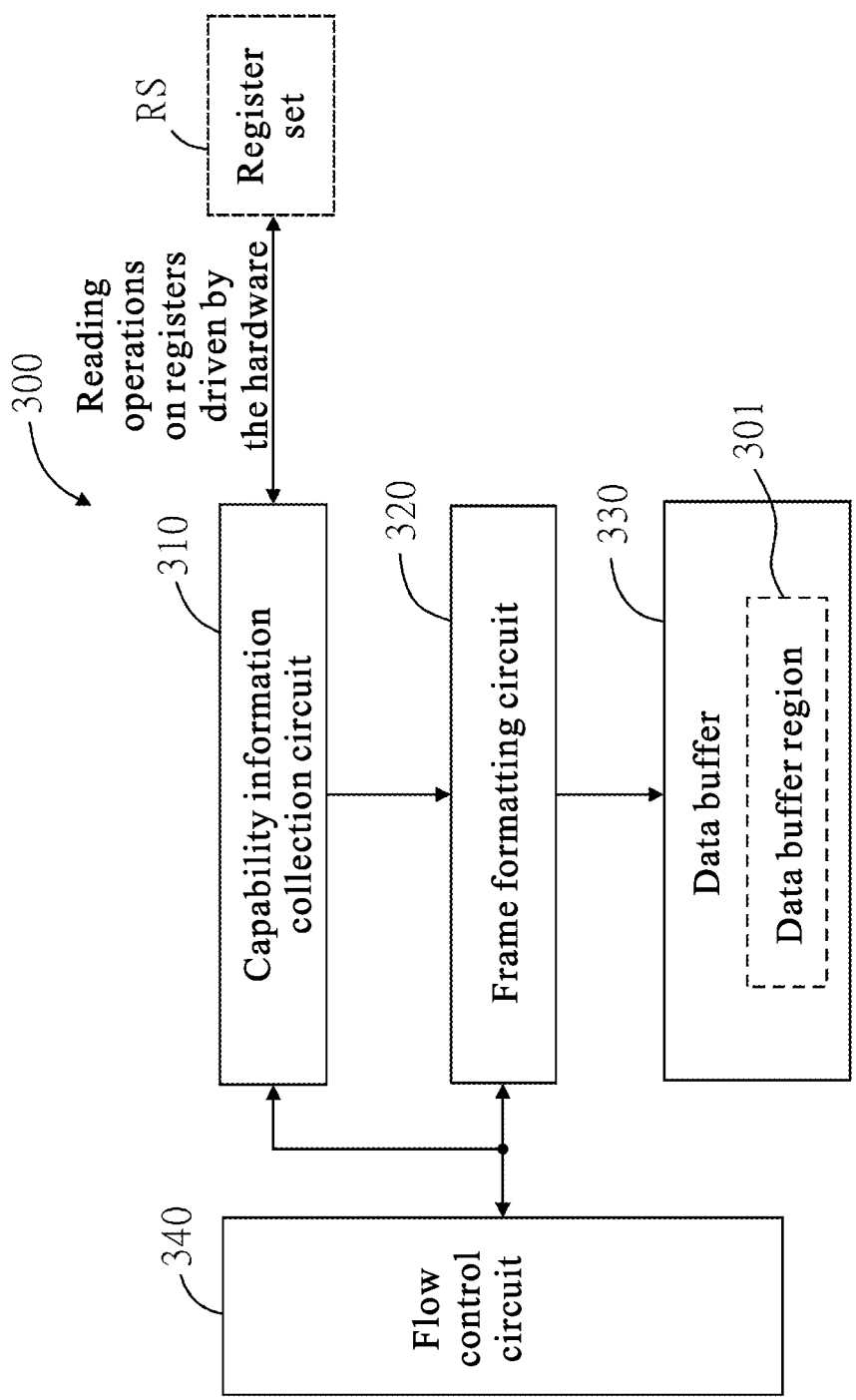
FIG. 3B is a schematic block diagram of an embodiment of a capability frame preparation circuit of FIG. 3A.

Refer to FIG. 3B showing a schematic block diagram of an embodiment of a capability frame preparation circuit of FIG. 3A. In the embodiment in FIG. 3B, the capability frame preparation circuit 300 includes a capability information collection circuit 310, a frame formatting circuit 320, a data buffer 330, and a flow control circuit 340. The capability information collection circuit 310 is used for performing reading operations on registers in a register set RS associated with a plurality of data fields in the capability frame. The frame formatting circuit 320 is used for performing frame formatting to facilitate construction of the capability frame. The data buffer 330 is, for example, a memory, which may be a volatile memory or a non-volatile memory and is used for providing the data buffer region 301 described above. The flow control circuit 340 is coupled to the capability information collection circuit 310, the frame formatting circuit 320, and the data buffer 330, and is used for controlling the capability information collection circuit 310 and the frame formatting circuit 320 to perform capability extraction and frame formatting so as to output capability frame information to the data buffer region 301. For example, the capability information collection circuit 310, the frame formatting circuit 320, and the flow control circuit 340 of the capability frame preparation circuit 300 can be implemented by logic circuits, state machines or other suitable circuits.

In some embodiments, the interconnection protocol for the circuit 30 in FIG. 3A is based on the Universal Flash Storage (UFS) standard, wherein a link layer of the UFS standard is implemented according to the UniPro specification. During the Link Startup Sequence (LSS) capability exchange of UniPro, a host and a storage device are required to send respective capability information in the form of capability frames to each other, wherein the capability frames are Physical Adapter Layer Control Protocol (PACP) frames. The capability information includes capability information from the UniPro layer and capability information from an associated physical (M-PHY) layer. Further, the capability information includes, for example, a plurality of attributes specified by UniPro and M-PHY or values obtained according to the attributes, wherein these attributes have corresponding attribute identifiers (ID) and corresponding values which may be referred to as capability values. According to the UniPro and M-PHY specifications, these capability values may be constant values. These constant values are extracted from circuits (e.g., a controller and a host interface) according to UniPro and M-PHY specifications, and are formatted to construct PACP capability frames (e.g., PACP_CAP_EXT2_ind, PACP_CAP_EXT1_ind and PACP_CAP_ind frames of version 1.8 or 2.0 of the UniPro specification) to be sent to a peer side, for the use in later capability downgrading so as to reach a consensus on the range of ultimate effective operations of both sides (that is, the host and the storage device). In view of the above, preparing for the PACP frames can be implemented by the capability frame preparation circuit 300 in FIG. 3B or a similar circuit architecture, and be applied to Link Startup Sequence (LSS) capability exchange for the UniPro.

According to the UniPro specification, a physical adapter (PA) layer uses PACP frames to communicate with a PA layer of a peer side. Refer to FIG. 4A to FIG. 4C showing schematic diagrams of examples of PACP frames according to the UniPro specification, showing data structures of PACP_CAP_ind, PACP_CAP_EXT1_ind and PACP_CAP_EXT2_ind frames respectively. According to the UniPro specification, each of the PACP frames of the PA layer includes a series of encoded 17-bit symbols. As shown in FIG. 4A, in the first symbol (which has 17 bits) of the PACP_CAP_ind frame, bit 16 in a value 1 indicates that the first symbol is a control symbol; the first symbol includes a value ESC_PA and a parameter EscParam_PA which is set to a value PACP_BEGIN, indicating that the frame is a frame of the PA layer and the first symbol is the start of the PACP frame, respectively. Moreover, as shown in FIG. 4A, in the second symbol (which has 17 bits) of the PACP_CAP_ind frame, bit 16 in a value 0 indicates that the second symbol is a data symbol; a field PACP_FunctionID in the second symbol which is set to a value PACP_CAP_ind (e.g., 0x0306 defined in the UniPro specification) indicates that the frame is a PACP_CAP_ind frame associated with capability information (or referred to as a capability frame). Moreover, as shown in FIG. 4A, in the third symbol to the last symbol (each of which has 17 bits) of the PACP_CAP_ind frame, bit 16 in a value 0 indicates that these symbols are all data symbols. The third symbol to the last symbols include a plurality of fields respectively, for example, fields including Flags, MaxHS, MaxPWM, TSleepNoConfig, TStallNoConfig, TSaveConfig, and version information (VersionInfo) defined in the UniPro specification, in which some reserved fields are present. The last symbol includes a checksum (e.g., a 16-bit CRC code (CRC-16)).

The values and fields of the PACP_CAP_ind frame are all defined in the UniPro specification. Refer to TABLE 1 below representing the description of the fields of the PACP_CAP_ind frame in the UniPro specification and the information sources from which data for these fields can be obtained. The information source means that the corresponding information can be obtained according to the corresponding attributes specified by UniPro or M-PHY. Each attribute usually has a certain value specified by UniPro or M-PHY, and the specified attributes can be implemented by registers (which representing any suitable memory units) to which corresponding values are assigned.

that in FIG. 4A, and the two differ in that the field PACP_FunctionID of the second symbol of the PACP_CAP_EXT2_ind frame is set to the value PACP_CAP_EXT2_ind to indicate that the frame is a frame associated with capability information (or referred to as a capability frame), and the third symbol to the following symbols of the PACP_CAP_EXT2_ind frame include a plurality of different fields, such as MaxHs, RxHsG4PrepareLength, RxHsG4SyncLength, RxHsAdaptRefresh and RxHsAdaptInitial, in which some reserved fields are similarly present.

The information sources related to the setting of the fields of the PACP_CAP_EXT1_ind and PACP_CAP_EXT2_ind frames can refer to the UniPro specification version 1.8 or later version.

The PACP frames associated with capability information in FIG. 4A to FIG. 4C may be prepared according to the capability frame preparation circuit 300 in FIG. 3B or a similar circuit architecture, and be applied to Link Startup Sequence (LSS) capability exchange for the UniPro. For example, when capability extraction and frame formatting performed by hardware are enabled, the flow control circuit 340 is used for controlling an operation flow and coordinating the cooperation among the capability information collection circuit 310, the frame formatting circuit 320, and the data buffer 330.

The capability information collection circuit 310 is used for performing reading operations on a plurality of specific

TABLE 1

| Field | Description | Source of information (referring to associated attribute) |
|---|---|---|
| Flags | Flags[1]: high-speed (HS) untermination capability Flags[0]: low-speed (LS) termination capability | TX_HS_Unterminated_LINE_Drive_Capability TX_LS_Terminated_LINE_Drive_Capability |
| MaxHS | Maximum HS gear; if high-speed mode unavailable, the value thereof is zero | TX_HSGEAR_Capability, TX_HSMODE_Capability |
| MaxPWM | Maximum pulse width modulation (PWM) gear | TX_PWMGEAR_Capability |
| TSleepNoConfig | M-PHY timing information | RX_Min_SLEEP_NoConfig_Time_Capability |
| TStallNoConfig | M-PHY timing information | RX_Min_STALL_NoConfig_Time_Capability |
| TSaveConfig | M-PHY timing information | RX_Min_SAVE_Config_Time_Capability |
| Version information (VersionInfo) | Local UniPro version | PA_LocalVerInfo |

In addition, the data structure of the PACP_CAP_EXT1_ind frame in FIG. 4B is similar to the that in FIG. 4A, and the two differ in that the field PACP_FunctionID of the second symbol of the PACP_CAP_EXT1_ind frame is set to a value PACP_CAP_EXT1_ind to indicate that the frame is a frame associated with capability information (or referred to as a capability frame), and the third symbol to the following symbols of the PACP_CAP_EXT1_ind frame include a plurality of different fields, such as THibern8, TMinActivate, Status, TAdvHibern8, TAdvMinActivate, RxAdvGranularity, MinRxTrailingClocks, RxPwmBurstClosureLength, RxLsPrepareLength, RxPwmG6G7SyncLength, RxHsG1PrepareLength, RxHsG1SyncLength, RxHsG2PrepareLength, RxHsG2SyncLength, RxHsG3PrepareLength and RxHsG3SyncLength, in which some reserved fields are similarly present.

Moreover, the data structure of the PACP_CAP_EXT2_ind frame in FIG. 4C is similar to the registers of the UniPro or M-PHY specification associated with a specific PACP frame (e.g., the capability frame above), that is, reading operations are directly or indirectly driven by hardware (circuits), for example, outputting signals associated with the reading operations. For example, the capability information collection circuit 310 performs reading operations on registers corresponding to attributes associated with a plurality of data fields in the PACP_CAP_ind frame to enable the capability frame preparation circuit 300 to receive data output by these registers and to further collect data for these data fields, wherein the associated attributes have, for example, the information sources enumerated in column 3 of TABLE 1, and values of the corresponding registers are obtained by using the attribute identifiers of the associated attributes. Similarly, the capability information collection circuit 310 can be implemented to perform reading operations on registers corresponding to attributes associated with the PACP_CAP_EXT1_ind and PACP_CAP_EXT2_ind frames so as to collect corresponding data, wherein the associated attributes are corresponding attributes associated with data fields of the frames according to the UniPro specification (e.g., version 1.8). For example, the capability information collection circuit 310 can be configured to directly or indirectly output the collected data to the frame formatting circuit 320, so that the collected data for the data fields can be received by the frame formatting circuit 320. For example, the collected data refers to data returned to the capability frame preparation circuit 300 by the registers after the capability information collection circuit 310 performs the reading operations on the registers.

The frame formatting circuit 320 is used to perform frame formatting for generating fields of a specific PACP capability frame (that is, corresponding frame formatting results) according to the data output by the capability information collection circuit 310 and the data structure of the capability frame, and writing the data structure of the specific PACP capability frame thus generated to the data buffer 330 (e.g., the data buffer region 301 provided thereby). For example, the frame formatting circuit 320 receives data associated with a certain field (e.g., the TSleepNoConfig field) of the PACP_CAP_ind frame output by the capability information collection circuit 310. Further, the frame formatting circuit 320 outputs a value of the field according to the data by way of encoding in a Big-endian format required in the UniPro specification, based on the data structure (as shown in FIG. 4A) of the PACP_CAP_ind frame in the UniPro specification, and writes the value to a corresponding address in a memory space of the PACP_CAP_ind frame under construction in the data buffer region 301 provided by the data buffer 330. Similarly, the frame formatting circuit 320 writes the value of each field in the PACP_CAP_ind frame to a corresponding address in the data buffer region 301 provided by the data buffer 330, and all bits in reserved fields are set to 1 according to the UniPro specification. Moreover, the frame formatting circuit 320 can further generate fields of the PACP_CAP_EXT1_ind and PACP_CAP_EXT2_ind frames by a similar approach, and write the data structures thereof to the data buffer region 301 provided by the data buffer 330.

The data buffer region 301 provided by the data buffer 330 stores the data structure of the PACP capability frame generated by hardware from the frame formatting circuit 320. The data buffer region 301 provided by the data buffer 330 can also be accessed by the processing unit 34 during a phase in which the processing unit 34 executes associated firmware for preparing the capability information. If certain portion in the data structure of the specific PACP capability frame generated by hardware needs to be modified and new data needs to be added, the processing unit 34 can complete such modification in this phase; if no modification is needed, the data structure generated by hardware remains unchanged. In the Link Startup Sequence (LSS) of the UniPro specification, upon entering the capability exchange phase, the data structures of these specific PACP capability frames are extracted and sent to a peer side accordingly. In an example, the data buffer region 301 provided by the data buffer 330 can include three or more areas corresponding to PACP_CAP_ind, PACP_CAP_EXT1_ind, and PACP_CAP_EXT2_ind frames (as shown in FIG. 4A to FIG. 4C), respectively, for the frame formatting circuit 320 or the processing unit 34 to read or write data, thereby preparing a portion or all of the fields of the data structure of the PACP capability frames. In an example of the circuit 30, preparation of capability information is implemented by configuring the capability frame preparation circuit 300, the processing unit 34, or both of the above so that the data buffer region 301 temporarily stores data for all of the fields in the data structure of a certain capability frame (such as any one in FIG. 4A to FIG. 4C), and the PACP sender circuit 400 is configured to be capable of reading the data for the fields of the capability frame in the data buffer region 301 to generate the capability frame directly. In another example of the circuit 30, preparation of capability information is implemented by configuring the capability frame preparation circuit 300, the processing unit 34, or both of the above so that the data buffer region 301 temporarily stores data for a portion of the fields in the data structure of a certain capability frame (such as any one in FIG. 4A to FIG. 4C), for example, in the data structure of the PACP_CAP_ind frame shown in FIG. 4A, the fields whose values are determined requiring reading from the register set RS, such as MaxPWM, MaxHS, Flags, TSleepNoConfig, TSaveConfigPACP, and TStallNoConfig. In this example, the PACP sender circuit 400 is configured to be capable of reading the fields of the capability frame in the data buffer region 301, and to be capable of combining them with data for other fields (e.g., setting corresponding fields) in the capability frame to thereby generate the capability frame, wherein the other fields are the fields having fixed values in the data structure of the PACP_CAP_ind frame shown in FIG. 4A, such as the fields ESC_PA, EscParam_PA, PACP_FunctionID, version information, and reserved. To this end, in the PACP sender circuit 400, a reading circuit can be configured to read the data for the fields of the capability frame (e.g., the PACP_CAP_ind frame) in the data buffer region 301, and a logic circuit such as a combination circuit can be configured to combine the data for certain fields of the capability frame read by the reading circuit and data for other fields of the capability frame to thereby generate the capability frame. For the example above, details of implementations for generating other capability frames such as PACP_CAP_EXT1_ind and PACP_CAP_EXT2_ind may be deduced similarly and thus will not be described herein. The two examples above associated with the circuit 30 are applicable or may be used to adjust various embodiments of the present disclosure accordingly, whenever appropriate.

Moreover, in the examples of PACP frames associated with capability information, for example, in the data structures of the frames in FIG. 4A to FIG. 4C, the PACP frame has a CRC symbol, and there are numerous implementations for obtaining the CRC symbol. In an embodiment, the hardware protocol engine 33 can use a CRC circuit to perform a CRC operation on an area of the data buffer region 301 in the data buffer 330 corresponding to a certain frame (e.g., PACP_CAP_ind, PACP_CAP_EXT1_ind, or PACP_CAP_EXT2_ind frame), and fill the CRC value thus obtained in the field corresponding to the CRC symbol in the data buffer region 301 to thereby obtain the capability frame. The CRC circuit may be disposed in the capability frame preparation circuit 300, or may be a CRC circuit disposed outside the capability frame preparation circuit 300. The CRC circuit can be, for example, implemented by a digital circuit based on a shift register. In another embodiment, the PACP sender circuit 400 can further be provided with the CRC circuit. In addition, the PACP sender circuit 400 can be configured to be capable of reading an area of the data buffer region 301 corresponding to a certain frame (such as PACP_CAP_ind, PACP_CAP_EXT1_ind, or PACP_CAP_EXT2_ind frame), use the CRC circuit to perform a CRC operation to obtain a CRC value, and append the CRC value to the capability frame information read from the data buffer region 301 to thereby obtain the capability frame. It is known from the above that, the hardware protocol engine 33 can be configured to generate one or more capability frames according to the content of the data buffer region 301, regardless of what approach is adopted for obtaining the CRC symbol of the frame. In other words, the implementation of the capability frame preparation circuit 300 is not limited by the way in which the CRC symbol is obtained; the capability frame preparation circuit 300 is not necessarily implemented to include the CRC circuit but may also be implemented to include the CRC circuit.

Figure 5:
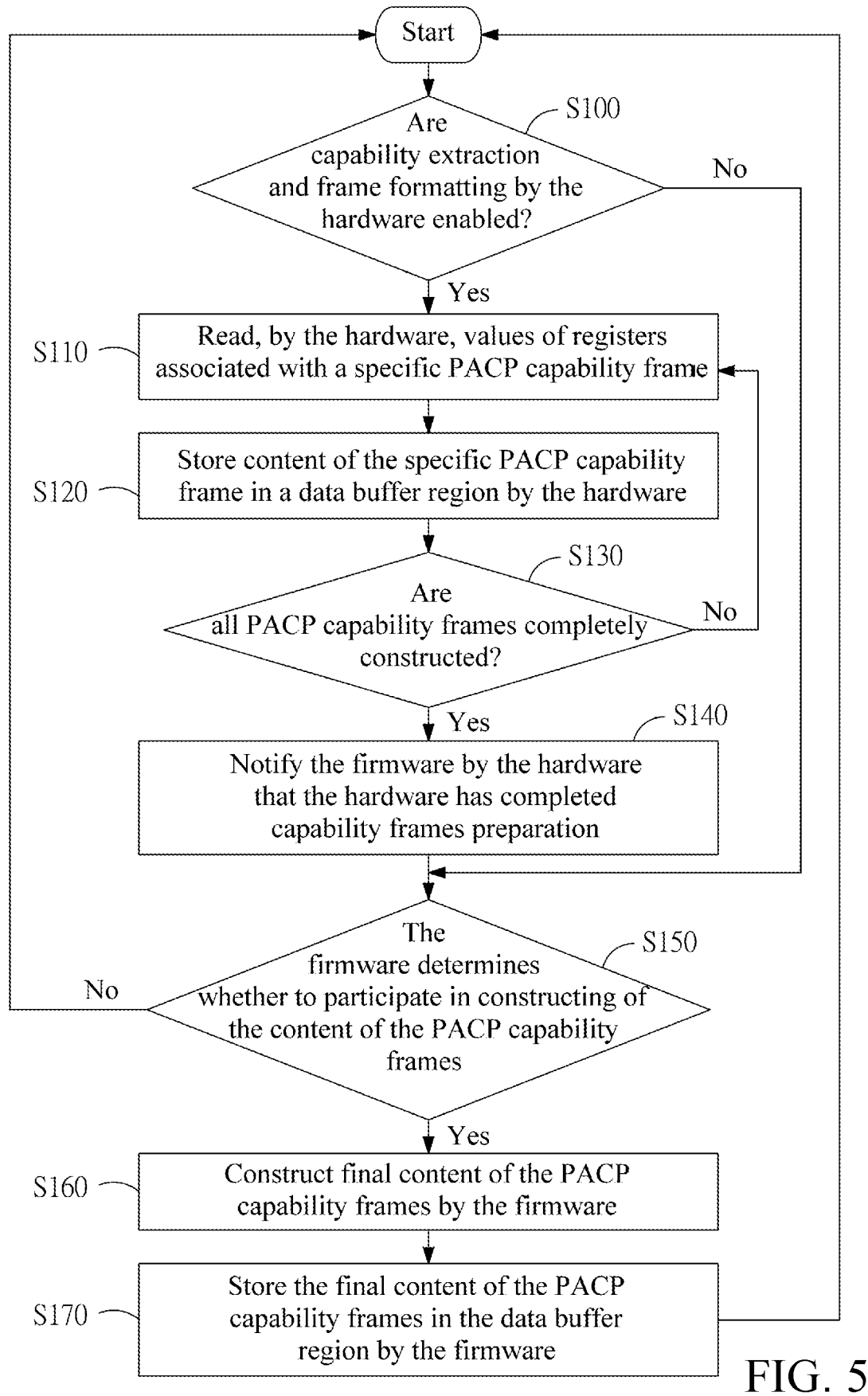
FIG. 5 is a schematic flowchart of a control flow of a circuit in FIG. 3A according to an embodiment.

Refer to FIG. 5 showing a schematic flowchart of a control flow of the circuit 30 in FIG. 3A according to an embodiment. The control flow shows that the circuit architecture according to the circuit 30 in FIG. 3A is capable of preparing capability frames by hardware, by firmware or by the cooperation of hardware and firmware.

In operation S100, it is determined whether capability extraction and frame formatting performed by the hardware are enabled. If the capability extraction and frame formatting are enabled, operation S110 is performed; if not, operation S150 is performed. The hardware can be implemented by any suitable circuit according to the circuit 30 in FIG. 3A, and more particularly implemented by a dedicated circuit such as the capability frame preparation circuit 300. The determination in operation S100 can be implemented by associated firmware that is for preparing capability information and is executed by the processing unit 34, or be implemented by hardware such as the hardware protocol engine 33. More specifically, in an implementation of using the cooperation of the hardware and the firmware or using only the hardware to prepare the PACP capability frame, when the PACP capability frame needs to be prepared, operation of the capability extraction and frame formatting by the hardware can be enabled by the hardware protocol engine 33 or the processing unit 34; in an implementation of using only the firmware to prepare the PACP capability frame, the above operation will not be enabled.

In operation S110, values of registers associated with a specific PACP capability frame to be constructed are read by the hardware.

In operation S120, content of the specific PACP capability frame to be constructed is stored in a data buffer region (e.g., 301 in FIG. 3A) by the hardware.

In operation S130, it is determined by the hardware whether data structures of all PACP capability frames to be constructed are completely constructed. If the data structures are completely constructed, operation S140 is performed; if the data structures are not completely constructed, operation S110 is performed and operations S110 to S130 are repeated until all PACP capability frames are completely constructed. The expression of being "completely constructed" herein refers to, in the content (e.g., values) of the fields of the data structures of all PACP capability frames, a portion of the content handled by the hardware has been constructed and stored in the data buffer region.

In operation S140, the hardware notifies the firmware that the preparation of the capability frames handled by the hardware has been completed.

In operation S150, it is determined by the firmware whether to participate in the constructing of the content of the PACP capability frames so as to complete final content of the data structures of the PACP capability frames. If the firmware is required to participate in the constructing, operation S160 is performed. If the firmware is not required to participate in the constructing, other operations can be performed, for example, returning to the start of the control flow, or performing other suitable operations such as notifying an associated circuit performing Link Startup Sequence (LSS) capability exchange in the hardware protocol engine 33 that the preparation of the capability frames has been completed. For example, in an implementation of using the cooperation of hardware and firmware or using only firmware to prepare the PACP capability frames, the firmware is configured as being required to participate in the constructing and thus operation S160 is performed. In an implementation using only hardware to prepare the PACP capability frames, the firmware is configured as being not required to participate in the constructing.

In operation S160, the final content of the PACP capability frames is constructed by the firmware. For example, in an implementation of using cooperation of the hardware and the firmware to prepare the PACP capability frames, operation S160 includes modifying the content of the data buffer region by the firmware. In an implementation of using only the firmware to prepare the PACP capability frames, operation S160 includes constructing the PACP capability frames by the firmware. After operation S160, operation S170 is performed.

In operation S170, the final content of the data structures of the PACP capability frames is stored in the data buffer region by the firmware. After operation S170, the control flow can be configured to return to the start of the control flow, as shown in FIG. 5. Alternatively, the control flow may be configured to perform other operations, for example, suspending or other suitable operations.

As shown by the control flow in the embodiment in FIG. 5, the circuit architecture according to the circuit 30 in FIG. 3A is capable of preparing capability frames by an implementation using hardware, using firmware, or using the cooperation of hardware and firmware.

In the following, capability information of the capability frames (e.g., PACP_CAP_EXT2_ind, PACP_CAP_EXT1_ind and PACP_CAP_ind frames) is prepared by cooperation of the capability information collection circuit 310 and the frame formatting circuit 320 controlled by the flow control circuit 340 in the capability frame preparation circuit 300. For example, after the firmware activates the capability extraction and frame formatting performed by the hardware, the capability frame preparation circuit 300 is capable of preparing the capability frames according to operations S110 to S130 in FIG. 5 as follows.

The flow control circuit 340 activates the capability information collection circuit 310 to construct the PACP_CAP_EXT2_ind frame. Next, the capability information collection circuit 310 collects information required for first constructing the PACP_CAP_EXT2_ind frame, for example, collecting data by reading the content of the registers associated capability in the UniPro layer and M-PHY layer, and the collected data is to be sent to the frame formatting circuit 320. Then, the flow control circuit 340 activates the operation of the frame formatting circuit 320. The frame formatting circuit 320 starts to construct content for the PACP_CAP_EXT2_ind frame and stores the data structure of the final frame in specific addresses (e.g., according to the data structure of the frame in FIG. 4C) of a data buffer region (e.g., 301 in FIG. 3A) assigned for this PACP_CAP_EXT2_ind frame.

Moreover, the flow control circuit 340 activates the capability information collection circuit 310 to collect data for constructing the PACP_CAP_EXT1_ind frame. The capability information collection circuit 310 collects the information needed for constructing the PACP_CAP_EXT1_ind frame, and sends the collected information to the frame formatting circuit 320. The flow control circuit 340 activates the operation of the frame formatting circuit 320. The frame formatting circuit 320 starts to construct content for the PACP_CAP_EXT1_ind frame and stores the data structure of the final frame in specific addresses (e.g., according to the data structure of the frame in FIG. 4B) of a data buffer region (e.g., 301 in FIG. 3A) for this PACP_CAP_EXT1_ind frame.

Next, the flow control circuit 340 activates the capability information collection circuit 310 to collect data for constructing the PACP_CAP_ind frame. The capability information collection circuit 310 collects the information needed for constructing the PACP_CAP_ind frame, and sends the collected information to the frame formatting circuit 320. The flow control circuit 340 activates the operation of the frame formatting circuit 320. The frame formatting circuit 320 starts to construct content for the PACP_CAP_ind frame and stores the data structure of the final frame in specific addresses (e.g., according to the data structure of the frame in FIG. 4A) of a data buffer region (e.g., 301 in FIG. 3A) for this PACP_CAP_ind frame.

According to operation S140, the flow control circuit 340 generates an indication signal to notify the firmware that the capability extraction and frame formatting performed by the hardware are completed.

According to operations S150 to S170, in an implementation of using the cooperation of the hardware and the firmware to prepare the PACP capability frames, the content of the PACP capability frames generated by the hardware needs to be modified by the firmware (correspondingly, the determination result of operation S150 is affirmative), and thus the firmware collects or extracts the required information and then modifies or writes to (e.g., represented by operations S160 and S170) the specific data fields of the PACP capability frames in the data buffer region (e.g., 301 in FIG. 3A). In an implementation of using only the hardware to prepare the PACP capability frames, the phase of capability extraction and frame formatting performed by the firmware can be ignored.

After the control flow of FIG. 5 is completed, the constructed PACP capability frames can be sent to a peer side during Link Startup Sequence (LSS) capability exchange for the UniPro.

Figure 6A:
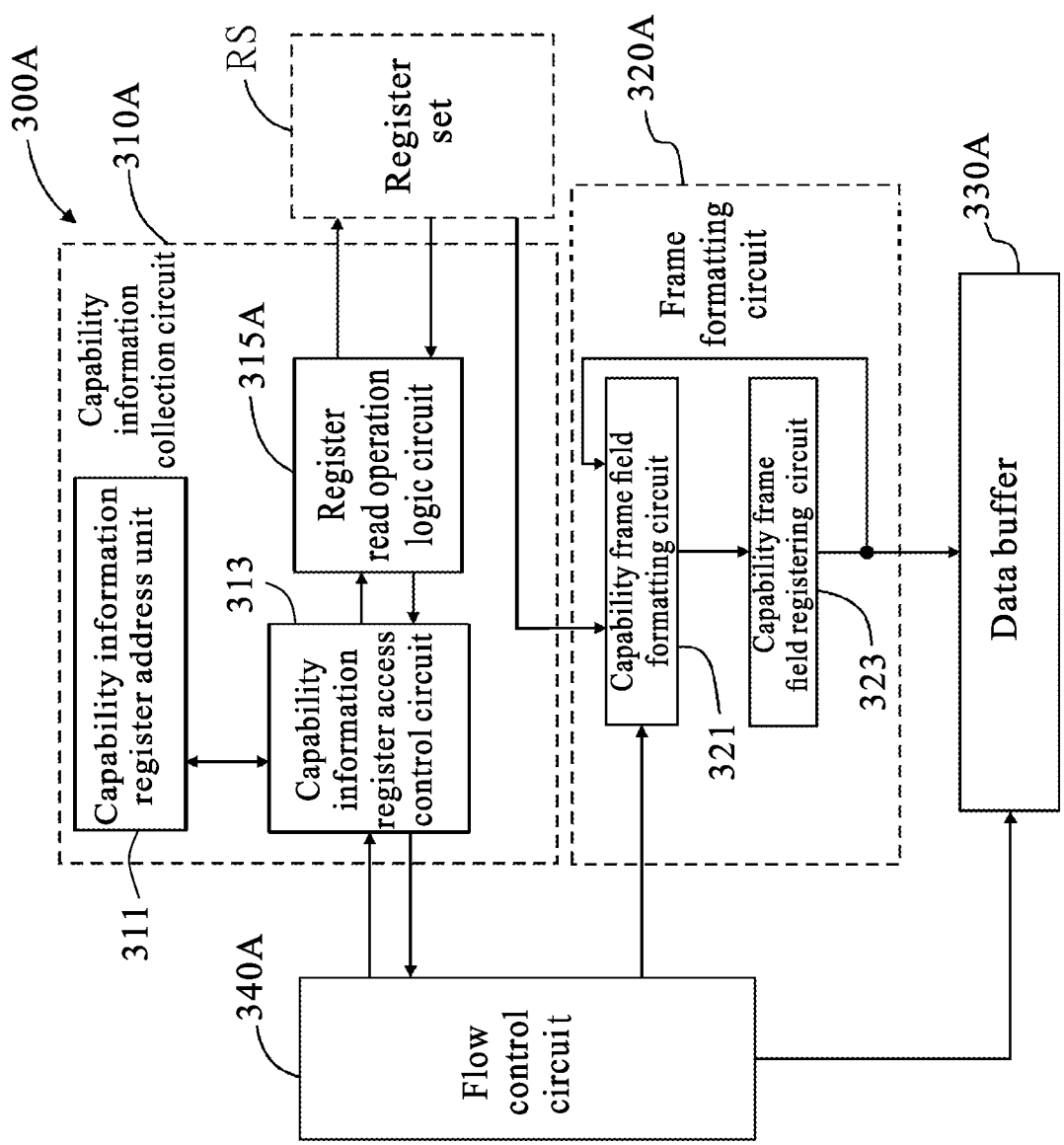
FIG. 6A is a schematic block diagram of an embodiment of the capability frame preparation circuit of FIG. 3B.

Refer to FIG. 6A showing a schematic block diagram of an embodiment of the capability frame preparation circuit 300 of FIG. 3B. In the embodiment in FIG. 6A, a capability frame preparation circuit 300A includes a capability information collection circuit 310A, a frame formatting circuit 320A, a data buffer 330A, and a flow control circuit 340A, which can be regarded as embodiments of the corresponding circuits (e.g., 310, 320, 330 and 340) included in the capability frame preparation circuit 300 in FIG. 3B. In the capability frame preparation circuit 300A, the flow control circuit 340A generates control signaling in the operation flow for constructing capability frames, and the data buffer 330A provides a storage space (e.g., corresponding to the data buffer region 301) that can be used for storing capability frames, wherein the flow control circuit 340A generates writing control signaling and outputs the writing control signaling to the data buffer 330A. In FIG. 6A, a register set RS represents a plurality of registers storing values of a plurality of attributes associated with capability information for an electronic device (e.g., the host 10 or the storage device 20) in the PA layer and M-PHY layer of UniPro, wherein the registers may be accessed by specific reading or writing signaling.

The capability information collection circuit 310A includes a capability information register address unit 311, a capability information register access control circuit 313, and a register read operation logic circuit 315A.

The capability information register address unit 311 is implemented to include a set of "index-address pairs" for a plurality of registers providing capability information, and to output an address of register in response to a request. An index-address pair is represented as, for example, (IND, ADDR), wherein IND represents an index value of the index-address pair and ADDR represents an address value of the index-address pair. The index value is used to obtain an address of a register (or referred to as a target register) corresponding to the index-address pair, and the address value is used to read a value stored in the target register. For example, a set of "index-address pairs" is created by assigning values to the "index-address pairs" respectively with respect to a plurality of registers associated with the capability information for the PA layer or M-PHY layer of UniPro and the fields of PACP frames (as shown in FIG. 4A to FIG. 4C) for capability information, which is implemented in the capability information register address unit 311, for example, by a lookup table or other suitable circuits, so as to obtain the addresses of the registers in an ordered manner according to the index-address pairs.

The capability information register access control circuit 313 is for controlling the operation flow of reading the value of the target register. For example, the operation flow includes the following operations: (1) receiving command signaling from the flow control circuit 340A so as to read the content of the target register associated with specific capability information; (2) fetching the address of the target register from the capability information register address unit 311 according to a command received; (3) sending the address of the target register to the register read operation logic circuit 315A; and (4) after the reading operation is completed, initializing internal logic to an initial state and reporting to the flow control circuit 340A.

The register read operation logic circuit 315A is used for generating a read operation signal so as to read the register set RS associated with capability information for the UniPro PA layer or M-PHY layer. The register read operation logic circuit 315A receives a read operation completion signal from the register set RS, wherein the read operation completion signal is handshake signaling that notifies of completion of a read request.

The frame formatting circuit 320A includes a capability frame field formatting circuit 321 and a capability frame field registering circuit 323.

The capability frame field formatting circuit 321 is used for aligning, arranging, and formatting input data so as to construct the fields of a specific PACP capability frame. The input data of the capability frame field formatting circuit 321 is from the following sources: data read from a register associated with specific capability information by the capability information collection circuit 310A and content of the capability frame field registering circuit 323. The capability frame field registering circuit 323 stores a result of a previous operation of the capability frame field formatting circuit 321.

The capability frame field formatting circuit 321 receives a formatting control signal output by the flow control circuit 340A. The formatting control signal instructs the capability frame field formatting circuit 321 how to align and arrange the input data into a required format. For example, the flow control circuit 340A is configured to output the formatting control signal a plurality of times in accordance with a plurality of values of the registers output from the register set RS for the format of a specific PACP frame (a frame in FIG. 4A to FIG. 4C, for example), so as to align and arrange the input data into a format required by the specific PACP frame. The result of each formatting operation is stored in the capability frame field registering circuit 323.

The capability frame field registering circuit 323 is used for providing a memory space that stores the operation results of the capability frame field formatting circuit 321. The frame formatting circuit 320A performs several rounds of aligning and formatting, and the content of specific fields of the specific PACP frame is then readily prepared on the capability frame field registering circuit 323. Thus, the flow control circuit 340A issues a write request to the data buffer 330A to latch the content (e.g., corresponding values) of the capability frame field registering circuit 323.

Taking constructing RxLsPrepareLength and RxPwmG6G7SyncLength fields of the PACP_CAP_EXT1_ind frame in FIG. 4B as an example, an embodiment is given below in detail, wherein the fields above include two following attributes (or corresponding registers) associated with capability information from the M-PHY layer: RX_LS_PREPARE_LENGTH_Capability- and RX_PWM_G6_G7_SYNC_LENGTH_Capability.

The operation flow for constructing the above fields is as below.

1. The flow control circuit 340A instructs the capability information register access control circuit 313 by a register access start control signal to read data from the RX_LS_PREPARE_LENGTH_Capability register.

2. The capability information register access control circuit 313 obtains the address of the RX_LS_PREPARE_LENGTH_Capability register from the capability information register address unit 311.

3. The capability information register access control circuit 313 sends the address of the target register to the register read operation logic circuit 315A.

4. The register read operation logic circuit 315A generates and outputs a read request signal carrying the address of the target register to the register set RS associated with capability information for the UniPro PA layer or M-PHY layer so as to read the value of the target register.

5. After the value of the target register is read, the register set RS returns a read operation completion signal and outputs the value of the target register. The register set RS outputs the value (that is, read data) of the target register to the capability frame field formatting circuit 321.

6. The register read operation logic circuit 315A returns the read operation completion signal to the capability information register access control circuit 313.

7. Then, the capability information register access control circuit 313 sends a register access completion signal to the flow control circuit 340A so as to complete the control signaling.

8. The control flow circuit 340A instructs the capability frame field formatting circuit 321 to perform: (a) placing the read data from the register set RS to an upper half portion of an output signal; and (b) placing the value from the capability frame field registering circuit 323 to a lower half portion of the output signal.

9. The output of the capability frame field formatting circuit 321 is stored in the capability frame field registering circuit 323.

10. The content of the capability frame field registering circuit 323 is retained until the next time the flow control circuit 340A activates the capability frame field formatting circuit 321.

11. The flow control circuit 340A instructs the capability information register access control circuit 313 to read data from the RX_PWM_G6_G7_SYNC_LENGTH_Capability register.

12. The capability information register access control circuit 313 obtains the address of the RX_PWM_G6_G7_SYNC_LENGTH_Capability register from the capability information register address unit 311.

13. The capability information register access control circuit 313 sends the address of the target register to the register read operation logic circuit 315A.

14. The register read operation logic circuit 315A generates and outputs a read request signal carrying the address of the target register to the register set RS associated with capability information for the UniPro PA layer or M-PHY layer so as to read the value of the target register.

15. After the value of the target register is read, the register set RS returns a read operation completion signal and outputs the value of the target register.

16. The register read operation logic circuit 315A returns the read operation completion signal to the capability information register access control circuit 313.

17. Then, the capability information register access control circuit 313 sends a register access completion signal to the flow control circuit 340A so as to complete the control signaling.

18. The flow control circuit 340A instructs the capability frame field formatting circuit 321 to perform: (c) placing the read data from the register set RS to a lower half portion of an output signal; and (d) placing the value from the capability frame field registering circuit 323 to an upper half portion of the output signal.

19. The output of the capability frame field formatting circuit 321 is stored in the capability frame field registering circuit 323.

20. The content of the capability frame field registering circuit 323 is retained until the next time the flow control circuit 340A activates the capability frame field formatting circuit 321.

21. Because the content of the target fields of the specific PACP capability frame is completed, the flow control circuit 340A activates a write operation of the data buffer 330A so as to maintain the value of the capability frame field registering circuit 323 at a specific value.

22. The construction of the fields of the specific capability frame is completed.

By constructing the content of each field for a specific PACP frame in a manner similar to above, the specific PACP frame can be constructed.

When all PACP capability frames are completely constructed, the task of preparing capability frame is completed.

Figure 6B:
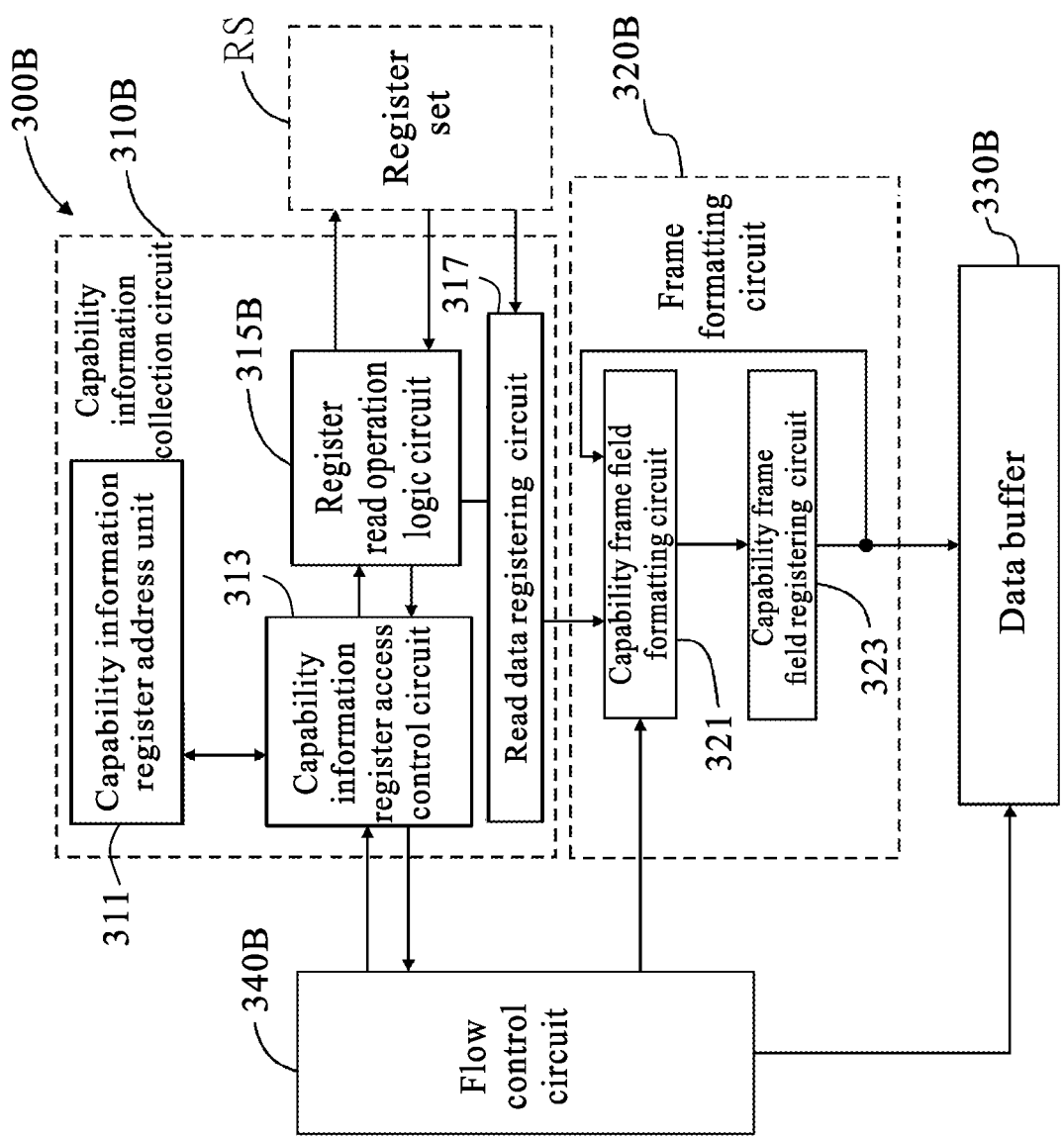
FIG. 6B is a schematic block diagram of another embodiment of the capability frame preparation circuit of FIG. 3B.

Refer to FIG. 6B showing a schematic block diagram of another embodiment of the capability frame preparation circuit 300 of FIG. 3B. In FIG. 6B, a capability frame preparation circuit 300B includes a capability information collection circuit 310B, a frame formatting circuit 320B, a data buffer 330B, and a flow control circuit 340B, which may be regarded as embodiments of the corresponding circuits (e.g., 310, 320, 330 and 340) included in the capability frame preparation circuit 300 in FIG. 3B. The two capability frame preparation circuits in FIG. 6B and FIG. 6A primarily differ in that, the capability information collection circuit 310B in the capability frame preparation circuit 300B shown in FIG. 6B further includes a read data registering circuit 317, and the capability frame field formatting circuit 321 receives read data from the register set RS through the read data registering circuit 317.

As shown in FIG. 6B, the capability information collection circuit 310B includes a capability information register address unit 311, a capability information register access control circuit 313, a register read operation logic circuit 315B and a read data registering circuit 317. The register read operation logic circuit 315B in FIG. 6B can be implemented as having an operation similar to the register read operation logic circuit 315A in FIG. 6A to generate a read operation signal so as to read the register set RS associated with capability information for the UniPro PA layer or M-PHY layer. Thus, the register read operation logic circuit 315B also receives a read operation completion signal from the register set RS. In response to the read operation completion signal, the register read operation logic circuit 315B outputs a control signal to the read data registering circuit 317 so that the read data registering circuit 317 temporarily stores the read data output by the register set RS and outputs the read data. The read data registering circuit 317 may be implemented by using circuits such as a register, a latch or the like. On the other hand, in response to the read operation completion signal, the register read operation logic circuit 315B reports to the flow control circuit 340B through the capability information register access control circuit 313. After receiving the report, the flow control circuit 340B instructs the capability frame field formatting circuit 321 of the frame formatting circuit 320B to receive the read data output by the read data registering circuit 317.

In addition, implementations and other operations of the capability information collection circuit 310B, the frame formatting circuit 320B, the data buffer 330B and the flow control circuit 340B in FIG. 6B are similar to the implementations and operations of the corresponding circuits in FIG. 6A, and will not be repeated herein for the sake of brevity.

Moreover, in some embodiments, the hardware protocol engine 33 performs capability extraction and frame formatting according to a first version of data structure (e.g., the capability frames of version 1.8 of the UniPro specification in FIG. 4A and FIG. 4C) of a first capability frame (e.g., the PACP_CAP_ind or PACP_CAP_EXT2_ind frame) to output first capability frame information (that is, a portion of information of content of the target first capability frame) for the first capability frame to corresponding addresses of the data buffer region, and the processing unit 34 performs capability extraction and frame formatting according to a second version of data structure (e.g., the capability frames of version 2.0 of the UniPro specification in FIG. 7A and FIG. 7B) of the first capability frame to output second capability frame information (that is, another portion of information of the content of the target first capability frame) for the first capability frame to a corresponding position of the data buffer region. Thus, the construction of the first capability frame can be completed by using the cooperation of hardware and firmware. When there are many capability frames that are required to be constructed, the circuit 30 can also be used to implement the same.

In some embodiments, the first capability frame information corresponds to the first version of data structure of the first capability frame and the second capability frame information corresponds to different data fields of the second version of data structure of the first capability frame as compared with the first version of data structure of the first capability frame.

An example is given below to demonstrate that the circuit architecture of the circuit 30 in FIG. 3A achieves flexibility in circuitry and design for capability frames preparation by implementations of cooperation of hardware and firmware.

It is assumed that the capability frame preparation circuit 300 in FIG. 3A for performing capability extraction and frame formatting is designed based on version 1.8 of the UniPro specification. When the capability frame preparation circuit 300 is applied to the design of version 1.8 of the UniPro specification, since the data structure generated by hardware is sufficient to generate required capability frames, only the hardware operation phase needs to be enabled while the firmware operation phase can be disabled. An effect of efficiently generating capability frames can be achieved because the capability frames are all generated by hardware.

When the capability frame preparation circuit 300 is applied to version 2.0 of the UniPro specification, in the circuit design stage, by comparing differences in capability frames and writing or modifying firmware accordingly, the capability frames can be prepared by further using the cooperation of hardware and firmware without changing the circuit (hardware).

Refer to FIG. 7A and FIG. 7B showing schematic diagrams of examples of PACP frames according to version 2.0 of the UniPro specification. FIG. 7A and FIG. 7B respectively show data structures of PACP_CAP_ind and PACP_CAP_EXT2_ind frames. Again referring to FIG. 4A and FIG. 7A, a difference between the PACP_CAP_ind frames of version 1.8 of the UniPro specification and version 2.0 of the UniPro specification lies in a new data field PACapabilityUserData. Again referring to FIG. 4C and FIG. 7B, a difference between the PACP_CAP_EXT2_ind frames of version 1.8 of the UniPro specification and version 2.0 of the UniPro specification lies in new data fields TExtSaveConfig, RxHsG5PrepareLength, RxHsG5SyncLength, RxHsG5AdaptRefresh, and RxHsG5AdaptInitial. Data of these new data fields needs to be additionally fetched from specific registers of the UniPro layer and M-PHY layer. Moreover, a difference between the PACP_CAP_EXT1_ind frames of version 1.8 of the UniPro specification and version 2.0 of the UniPro specification lies in a new data field ExtMinRxTrailingClocks of version 2.0 of the UniPro specification, which has a value that can be set to a fixed value (e.g., 0b00) in version 2.0 of the UniPro specification.

Since the capability frame preparation circuit 300 is designed for version 1.8 of the UniPro specification, the above new data fields (PACapabilityUserData, TExtSaveConfig, RxHsG5PrepareLength, RxHsG5SyncLength, RxHsG5AdaptRefresh and RxHsG5AdaptInitial) are not generated in the hardware operation phase of capability extraction and frame formatting performed by the capability frame preparation circuit 300.

Moreover, according to FIG. 3A, associated firmware for preparing capability information is configured to activate a function of the firmware for preparing capability frame and to perform capability extraction and frame formatting for the above new data fields for the PACP_CAP_ind and PACP_CAP_EXT2_ind frames. According to the control flow of FIG. 5, as the firmware operation phase is activated, the processing unit 34 executes the firmware to perform associated reading operations on the above new data fields to obtain required additional information and to integrate the additional information into a data structure of capability frames constructed by hardware and stored in a data buffer region (e.g., 301 in FIG. 3A), wherein the reading operations are directly or indirectly driven by the firmware (the processing unit 34), for example, using attribute identifiers of associated attributes to obtain values of corresponding registers.

Accordingly, under the circuit architecture of the circuit 30 in FIG. 3A, in terms of capability frames preparation, the capability frame preparation circuit 300 designed according to version 1.8 (or referred to as a first version) of the UniPro specification can be applied to a controller for implementing an interconnection protocol compliant with version 1.8 of the UniPro specification and version 2.0 (or referred to as a second version) of the UniPro specification without having to change hardware of the capability frame preparation circuit 300.

Moreover, in terms of capability frames preparation, a controller for implementing an interconnection protocol compliant with version 2.0 of the UniPro specification may apply the capability frame preparation circuit 300 designed according to version 1.8 (or referred to as a first version) of the UniPro specification, and may apply firmware which is configured to perform capability extraction and frame formatting of different data fields (e.g., the above new data fields of the PACP_CAP_EXT2_ind or PACP_CAP_ind frame of version 2.0 of the UniPro specification) of capability frames of version 2.0 (or referred to as a second version) of the UniPro specification as compared with version 1.8 (or referred to as a first version) of the UniPro specification. Thus, with the cooperation of hardware and firmware, processing efficiency and implementation flexibility can be both achieved. Moreover, for the new data field ExtMinRxTrailingClocks of the PACP_CAP_EXT1_ind frame of version 2.0 of the UniPro specification or other field having a fixed value in other capability frames, setting may be performed by firmware. Alternatively, as in the example associated with the circuit 30, a logic circuit may be configured in the PACP sender circuit 400 to perform setting of corresponding fields to thereby facilitate generating of capability frames.

It is known from the above embodiments, in response to changes in the content of capability information required by an updated version of the interconnection protocol, the capability information can still be efficiently prepared for the interconnection protocol by configuring cooperation of circuits and firmware of the controller without changing the hardware design. Certainly, although the above examples are given by using some versions of the UniPro specification, it should be noted that the implementation of the present disclosure is not limited to the above examples and is also applicable to later updated versions.

Moreover, in the present disclosure, the state of a signal to be "asserted" (or other alternative forms such as "asserting" or "assertion") means that a signal is set to be in an active state (or an active signal level), which may be a high or low level. The state of a signal to be "de-asserted" (or other alternative forms such as "de-asserting" or "de-assertion") means that a signal is set to be in an inactive state (or an inactive signal level), which may be a high or low level. If a signal is set to be at a low level to represent an active state (active-low), asserting the signal means that the signal is set to a low level, and de-asserting the signal means that the signal is set to a high level. If a signal is set to be at a high level to represent an active state (active-high), asserting the signal means that the signal is set to a high level, and de-asserting the signal means that the signal is set to a low level.

Moreover, in the embodiments related to the host and the storage device above, the hardware protocol engine in the host controller or the device controller can be designed based on Hardware Description Language (HDL) such as Verilog or techniques of any other design methods of digital circuits generally known to a person skilled in the art, and can be implemented by one or more circuits based on the circuit such as a field programmable gate array (FPGA), an application-specific integrated circuit (ASIC) or a complex programmable logic device (CPLD), or be implemented by a dedicated circuit or module. The host controller or the device controller (or a processing unit or a hardware protocol engine therein) can also be implemented based on a microcontroller, a processor or a digital signal processor (DSP).

The present disclosure provides a plurality of embodiments of a controller capable of preparing capability information for an interconnection protocol and an electronic device using the controller. Thus, the electronic device is capable of more efficiently and flexibly preparing the capability information according to the specification of the interconnection protocol to thereby facilitate link establishment. In some embodiments, in response to changes in the content of capability information required by an updated version of the interconnection protocol, the capability information can still be efficiently prepared for the interconnection protocol with the cooperation of circuits and firmware of the controller without changing the hardware design.

The present invention is disclosed by way of the embodiments above. A person skilled in the art should understand that, these embodiments are merely for illustrating the present invention and are not to be construed as limitations to the scope of the present invention. It should be noted that all equivalent changes, replacements and substitutions made to the embodiments are encompassed within the scope of the present invention. Therefore, the scope of legal protection of the present invention should be defined by the appended claims.

What is claimed is:

1. A controller located within a first device, the first device configured to link to a second device according to an interconnection protocol, the controller comprising:
   a hardware protocol engine for implementing a link layer of the interconnection protocol, wherein the hardware protocol engine is configured to perform capability extraction and frame formatting to output capability frame information to a data buffer region and configured to send, according to content of the data buffer region, at least one capability frame to the second device during Link Startup Sequence (LSS) capability exchange for the interconnection protocol; and
   a processing unit coupled to the hardware protocol engine and configured modify, during the LSS capability exchange for the interconnection protocol, the content of the data buffer region after the hardware protocol engine outputs the capability frame information to the data buffer region and before the at least one capability frame is sent to the second device,
   wherein the hardware protocol engine is configured to perform capability extraction and frame formatting with respect to a first capability frame included in the at least one capability frame to output first capability frame information for the first capability frame to the data buffer region, and the processing unit is configured to perform capability extraction and frame formatting with respect to the first capability frame to output second capability frame information for the first capability frame to the data buffer region.

2. The controller to according to claim 1, wherein the hardware protocol engine is configured to perform capability extraction and frame formatting according to a first version of data structure of the first capability frame included in the at least one capability frame to output the first capability frame information for the first capability frame to the data buffer region, and the processing unit is configured to perform capability extraction and frame formatting according to a second version of data structure of the first capability frame to output the second capability frame information for the first capability frame to the data buffer region.

3. The controller to according to claim 2, wherein the first capability frame information corresponds to the first version of data structure of the first capability frame and the second capability frame information corresponds to one or more different data fields of the second version of data structure of the first capability frame as compared with the first version of data structure of the first capability frame.

4. The controller to according to claim 1, wherein the hardware protocol engine includes a capability frame preparation circuit comprising:
   a capability information collection circuit for performing reading operations on registers associated with data fields in a capability frame among the at least one capability frame to collect data for the data fields;
   a frame formatting circuit for performing frame formatting according to the data for the data fields and a data structure of the capability frame and storing corresponding frame formatting results in the data buffer region;
   a memory including the data buffer region; and
   a flow control circuit, coupled to the capability information collection circuit, the frame formatting circuit, and the memory, for controlling the capability information collection circuit and the frame formatting circuit,
   wherein the flow control circuit activates the capability information collection circuit to collect the data for the data fields;
   wherein the flow control circuit activates the frame formatting circuit to receive the collected data for the data fields, perform frame formatting, and store the corresponding frame formatting results in the data buffer region.

5. The controller according to claim 1, wherein the link layer is implemented according to United Protocol (UniPro) specification and the at least one capability frame is a Physical Adapter Layer Control Protocol (PACP) frame.

6. The controller according to claim 1, wherein the interconnection protocol is based on Universal Flash Storage (UFS) standard.

7. An electronic device, configured to link to another electronic device according to an interconnection protocol, the electronic device comprising:
   an interface circuit for implementing a physical layer of the interconnection protocol to link to the another electronic device; and
   a hardware protocol engine, coupled to the interface circuit, for implementing a link layer of the interconnection protocol, wherein the hardware protocol engine is configured to perform capability extraction and frame formatting to output capability frame information to a data buffer region and configured to send, according to content of the data buffer region, at least one capability frame to the second device during Link Startup Sequence (LSS) capability exchange for the interconnection protocol; and
   a processing unit coupled to the hardware protocol engine and configured to modify, during the LSS capability exchange for the interconnection protocol, the content of the data buffer region after the hardware protocol engine outputs the capability frame information to the data buffer region and before the at least one capability frame is sent to the second device,
   wherein the hardware protocol engine is configured to perform capability extraction and frame formatting with respect to a first capability frame included in the at least one capability frame to output first capability frame information for the first capability frame to the data buffer region, and the processing unit is configured to perform capability extraction and frame formatting with respect to the first capability frame to output second capability frame information for the first capability frame to the data buffer region.

8. The electronic device to according to claim 7, wherein the hardware protocol engine is configured to perform capability extraction and frame formatting according to a first version of data structure of the first capability frame included in the at least one capability frame to output the first capability frame information for the first capability frame to the data buffer region, and the processing unit is configured to perform capability extraction and frame formatting according to a second version of data structure of the first capability frame to output the second capability frame information for the first capability frame to the data buffer region.

9. The electronic device to according to claim 8, wherein the first capability frame information corresponds to the first version of data structure of the first capability frame and the second capability frame information corresponds to one or more different data fields of the second version of data structure of the first capability frame as compared with the first version of data structure of the first capability frame.

10. The electronic device to according to claim 7, wherein the hardware protocol engine includes a capability frame preparation circuit comprising:
    a capability information collection circuit for performing reading operations on registers associated with data fields in a capability frame among the at least one capability frame to collect data for the data fields;
    a frame formatting circuit for performing frame formatting according to the data for the data fields and a data structure of the capability frame and storing corresponding frame formatting results in the data buffer region;
    a memory including the data buffer region; and
    a flow control circuit, coupled to the capability information collection circuit, the frame formatting circuit, and the memory, for controlling the capability information collection circuit and the frame formatting circuit,
    wherein the flow control circuit activates the capability information collection circuit to collect the data for the data fields;
    wherein the flow control circuit activates the frame formatting circuit to receive the collected data for the data fields, perform frame formatting, and store the corresponding frame formatting results in the data buffer region.

11. The electronic device according to claim 7, wherein the link layer is implemented according to United Protocol (UniPro) specification and the at least one capability frame is a Physical Adapter Layer Control Protocol (PACP) frame.

12. The electronic device according to claim 7, wherein the interconnection protocol is based on Universal Flash Storage (UFS) standard.

* * * * *